United States Patent
Nakagawa et al.

(10) Patent No.: US 7,059,120 B2
(45) Date of Patent: Jun. 13, 2006

(54) DEVICE FOR CONTROLLING INTERNAL COMBUSTION ENGINE

(75) Inventors: Norihisa Nakagawa, Numazu (JP); Mamoru Yoshioka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/887,977

(22) Filed: Jul. 12, 2004

(65) Prior Publication Data

US 2005/0028517 A1    Feb. 10, 2005

(30) Foreign Application Priority Data

Aug. 8, 2003  (JP) ............... 2003-206833

(51) Int. Cl.
*F01N 3/00*   (2006.01)
(52) U.S. Cl. ............... 60/289; 60/276; 60/277; 60/285
(58) Field of Classification Search ............... 60/276, 60/277, 285, 289; 123/198 F, 481
See application file for complete search history.

(56) References Cited

U.S. PATENT DOCUMENTS

| | | | |
|---|---|---|---|
| 5,509,267 A * | 4/1996 | Theis ............... | 60/274 |
| 5,609,023 A | 3/1997 | Katoh et al. | |
| 5,678,402 A | 10/1997 | Kitagawa et al. | |
| 5,842,340 A | 12/1998 | Bush et al. | |
| 5,901,552 A | 5/1999 | Schnaibel et al. | |
| 5,974,788 A * | 11/1999 | Hepburn et al. ............... | 60/274 |
| 6,216,450 B1 * | 4/2001 | Takahashi et al. ............ | 60/276 |
| 6,374,596 B1 * | 4/2002 | Taga et al. ............ | 60/277 |
| 6,546,719 B1 | 4/2003 | Kamoto et al. | |
| 6,553,754 B1 * | 4/2003 | Meyer et al. ............... | 60/277 |
| 6,622,478 B1 * | 9/2003 | Nakamura ............... | 60/285 |
| 6,751,947 B1 * | 6/2004 | Lewis et al. ............... | 60/277 |
| 2003/0150208 A1 * | 8/2003 | Hirata et al. ............... | 60/285 |

FOREIGN PATENT DOCUMENTS

| | | |
|---|---|---|
| JP | A 8-193537 | 7/1996 |
| JP | A 2001-227383 | 8/2001 |

* cited by examiner

*Primary Examiner*—Thomas Denion
*Assistant Examiner*—Diem Tran
(74) *Attorney, Agent, or Firm*—Oliff & Berridge, PLC

(57) ABSTRACT

An upstream-side catalyst is arranged in an exhaust passage and a downstream-side catalyst is arranged in the exhaust passage downstream of the upstream-side catalyst. An air-fuel ratio sensor is attached for detecting the air-fuel ratio in the exhaust passage between the upstream-side catalyst and downstream-side catalyst. A representative upstream-side stored oxygen value OXU is calculated based on whether the control state of the engine is the "slight rich" control, "slight lean" control, fuel increase correction, or engine fuel cut and a representative downstream-side stored oxygen value OXD is calculated based on the engine control state and the output of the air-fuel ratio sensor. If the representative upstream-side stored oxygen value OXU or the representative downstream-side stored oxygen value OXD becomes smaller than the corresponding allowable lower limit LLU or LLD, "slight lean" control is performed, while if it becomes larger than the corresponding allowable upper limit ULU or ULD, "slight rich" control is performed.

17 Claims, 33 Drawing Sheets

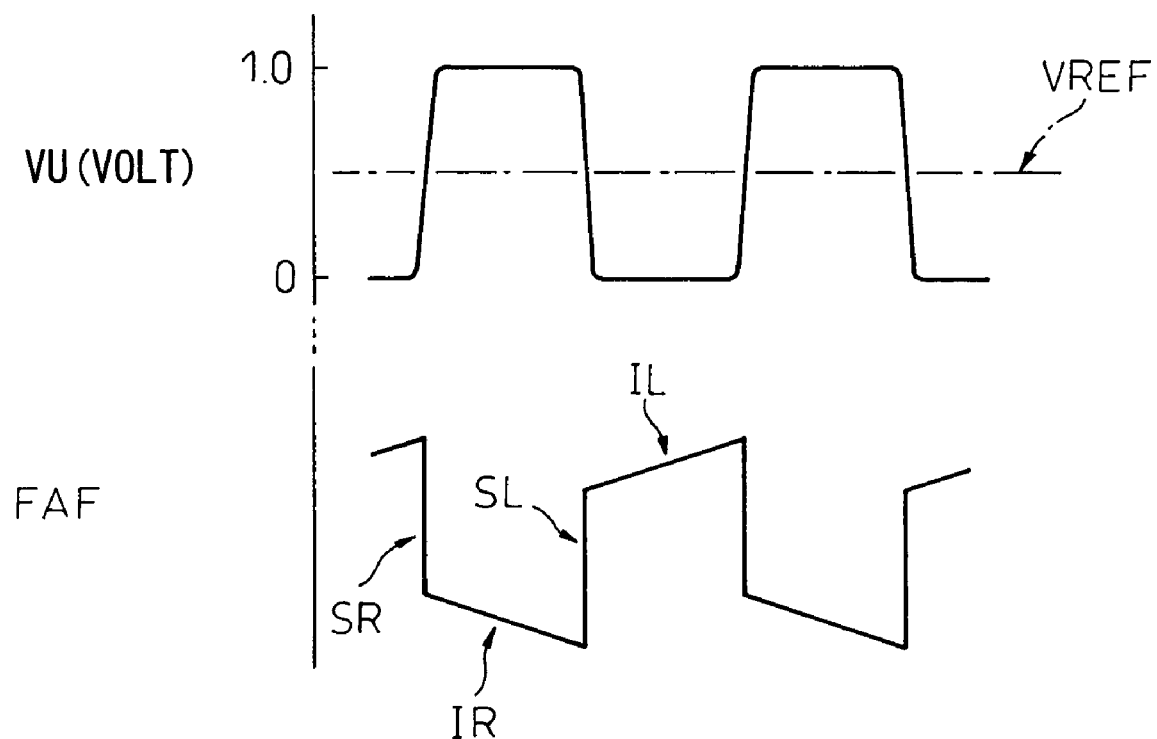

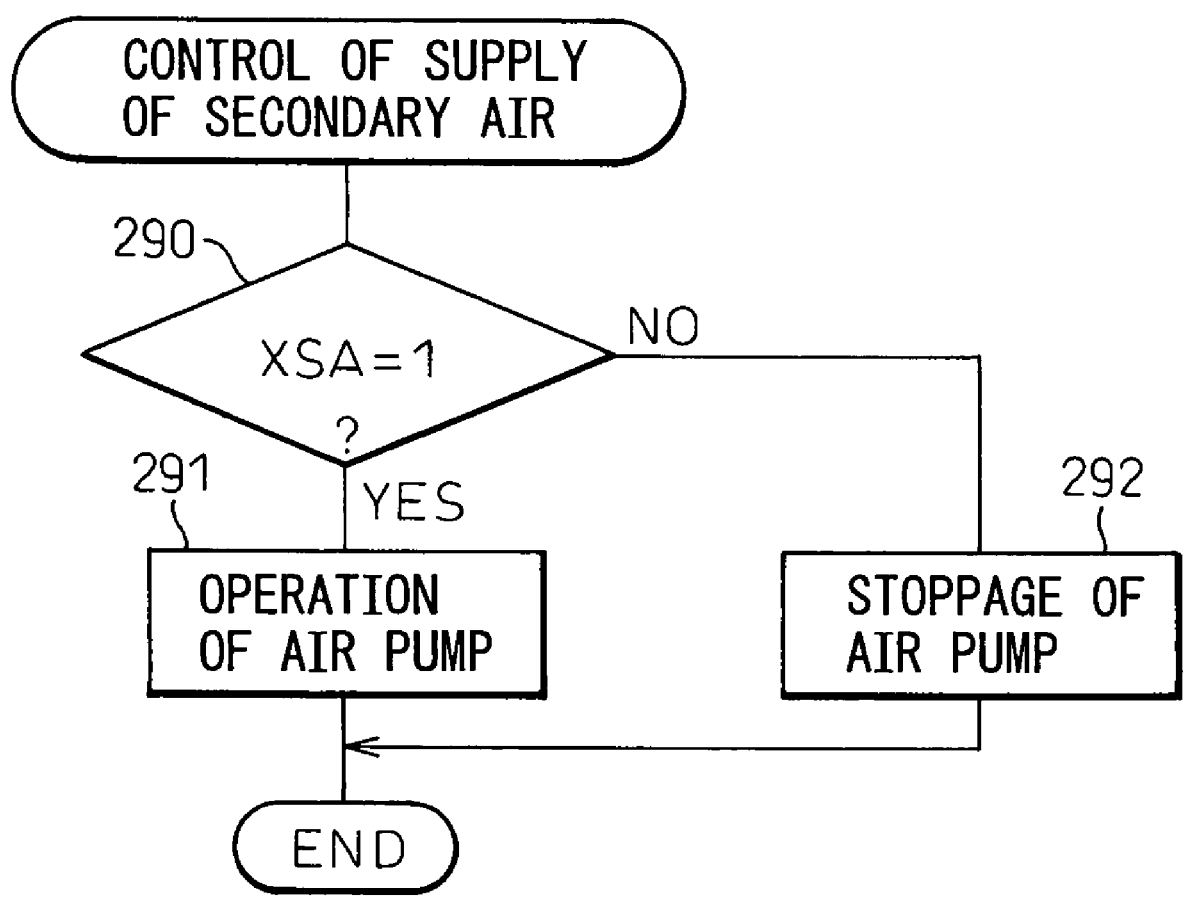

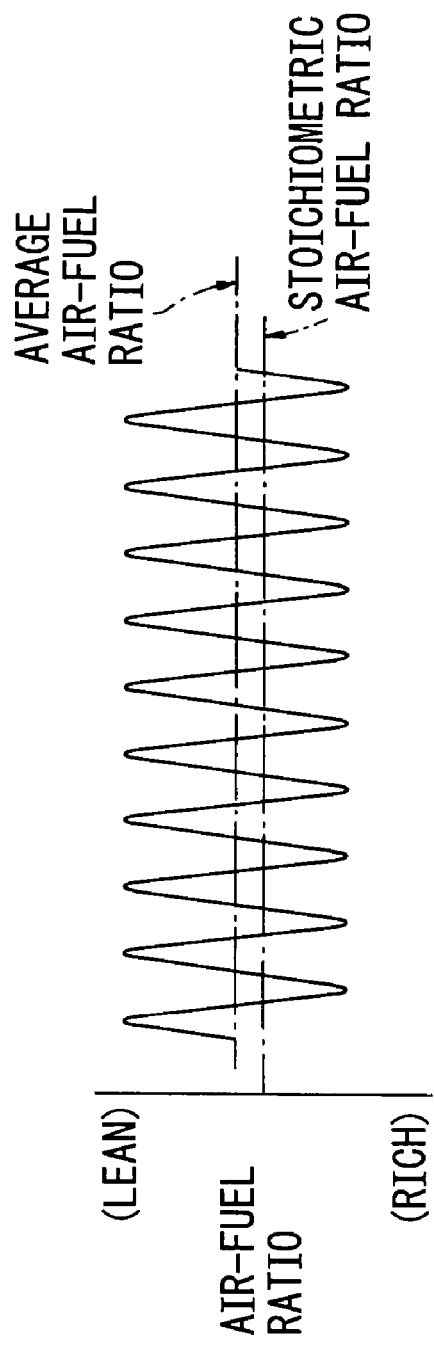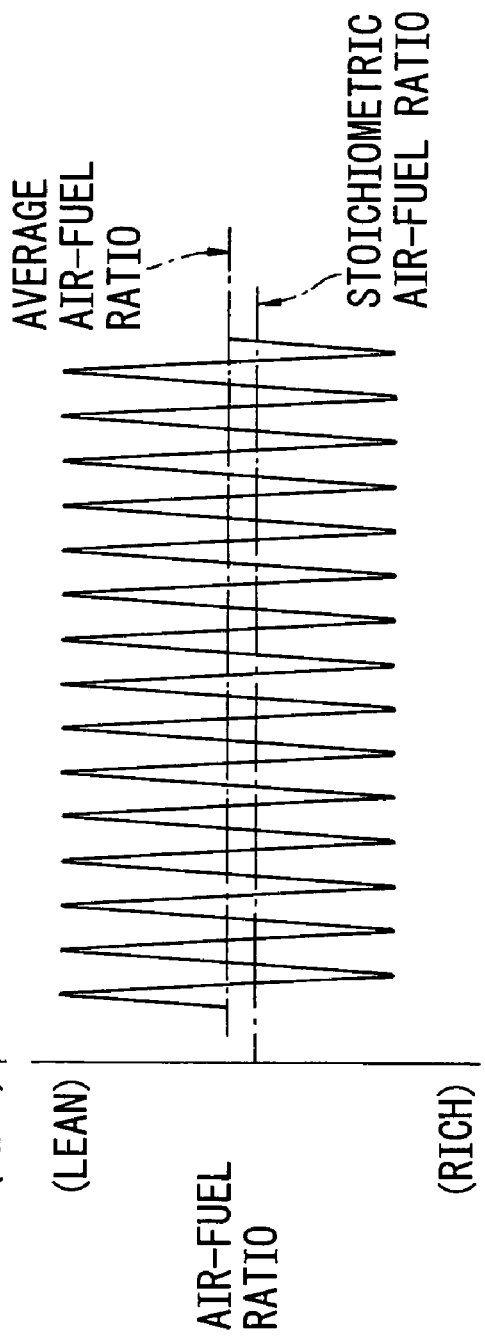
Fig.24A
Fig.24B

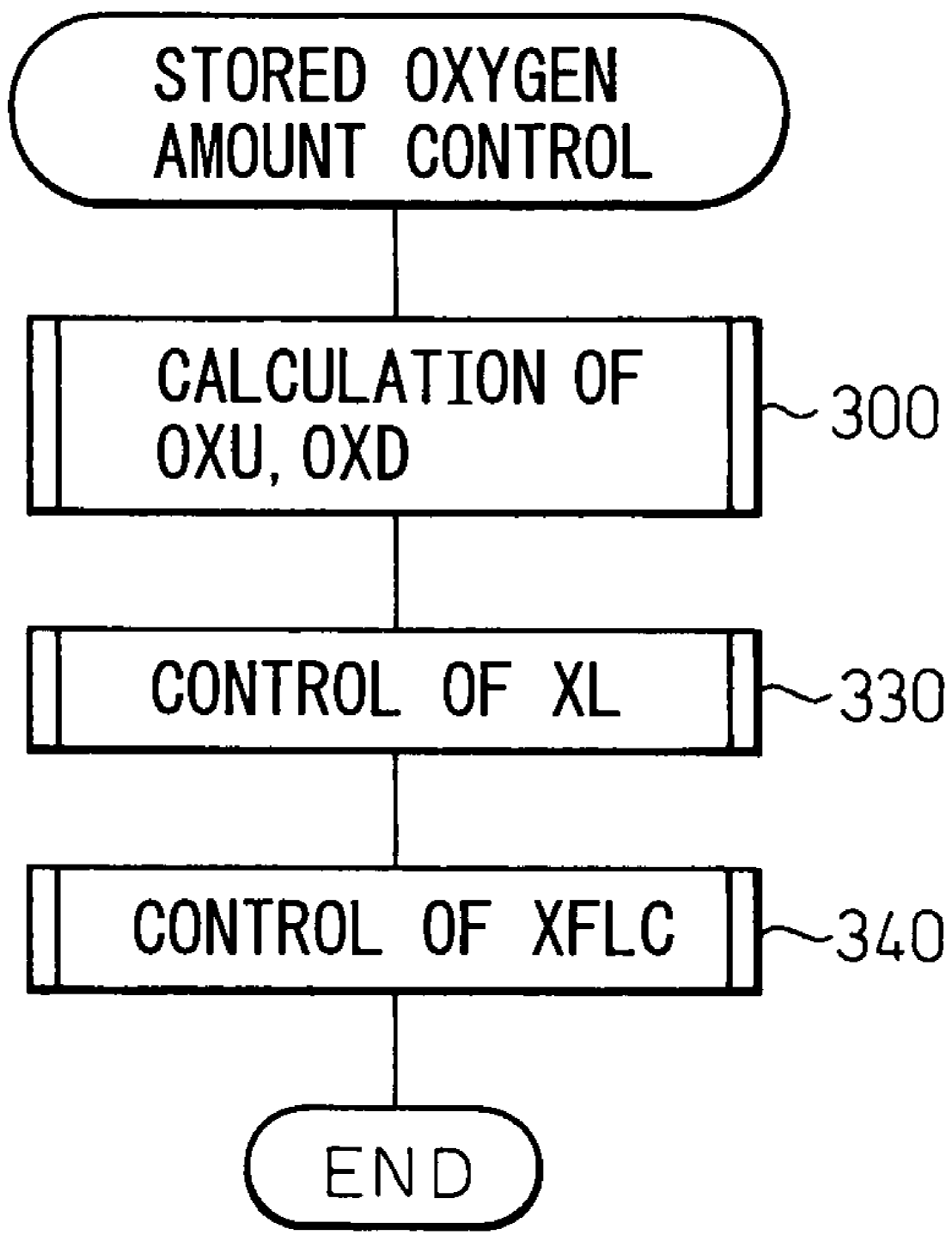

DEVICE FOR CONTROLLING INTERNAL COMBUSTION ENGINE

BACKGROUND OF THE INVENTION

1. Field of the Invention

The present invention relates to a device for controlling an internal combustion engine.

2. Related Art

In the past, there has been known an internal combustion engine designed to find the amount of stored oxygen of a three-way catalyst arranged in the engine exhaust passage, switch the air-fuel ratio just slightly to lean when the amount of stored oxygen of the three-way catalyst becomes smaller, switch the air-fuel ratio just slightly to rich when the amount of stored oxygen of the three-way catalyst becomes greater, and thereby maintain the amount of stored oxygen of the three-way catalyst in the target range. This will be explained later in more detail, but if doing this, it is possible to efficiently purify the unburned HC, CO, and NOx contained in the exhaust gas even when the air-fuel ratio greatly deviates from the stoichiometric air-fuel ratio.

To maintain the amount of stored oxygen of the three-way catalyst in the target range, it is necessary to accurately find the amount of stored oxygen of the three-way catalyst. On the other hand, at the time of engine deceleration operation, the general practice has been to temporarily cut the fuel to the engine. By cutting the fuel to the engine, air passes through the combustion chambers and directly flows into the three-way catalyst.

Therefore, there is known an internal combustion engine designed to calculate the amount of stored oxygen of the three-way catalyst when the fuel to the engine is cut by adding a relatively large addition term, calculate the amount of stored oxygen of the three-way catalyst when the fuel to the engine is not cut and the air-fuel ratio is rich by subtracting a relatively small subtraction term, and calculate the amount of stored oxygen of the three-way catalyst when the fuel to the engine is not cut and the air-fuel ratio is lean by adding a relatively small addition term (see Japanese Unexamined Patent Publication (Kokai) No. 2001-227383).

However, when an additional three-way catalyst is arranged in the exhaust passage upstream of that catalyst, there is the problem that what is calculated by the above-mentioned method is the total of the amount of stored oxygen of the two three-way catalysts or the amount of stored oxygen of the additional three-way catalyst at the upstream-side and therefore the amount of stored oxygen of the downstream-side three-way catalyst cannot be calculated independently.

SUMMARY OF THE INVENTION

Therefore, the object of the present invention is to provide a device for controlling an internal combustion engine able to accurately find the amount of stored oxygen of a downstream-side catalyst when a plurality of catalysts are arranged in an exhaust passage.

According to the present invention, there is provided a device for controlling an internal combustion engine having an exhaust passage, the device comprising: an upstream-side catalyst arranged in the exhaust passage, having oxygen storing capability; a downstream-side catalyst arranged in the exhaust passage downstream of the upstream-side catalyst, having oxygen storing capability; an air-fuel ratio sensor arranged in the exhaust passage between the upstream-side catalyst and the downstream-side catalyst for detecting an air-fuel ratio; and stored oxygen amount control means for controlling the amount of stored oxygen of the downstream-side catalyst, wherein an amount of stored oxygen of the downstream-side catalyst is found based on a control state of the engine and an output of the air-fuel ratio sensor, and wherein the amount of stored oxygen of the downstream-side catalyst is controlled based on the found amount of stored oxygen of the downstream-side catalyst.

The present invention may be more fully understood from the description of the preferred embodiments according to the invention as set forth below, together with the accompanying drawings.

BRIEF DESCRIPTION OF THE DRAWINGS

In the drawings:

FIG. 5 is a view for explaining a correction action by the feedback correction coefficient FAF;

FIG. 23 is a flow chart of a routine for control of secondary air supply of the second embodiment according to the present invention;

FIGS. 24A and 24B are views for explaining air-fuel ratio fluctuation control;

FIG. 25 is a flow chart of a routine for control of the amount of stored oxygen of a third embodiment according to the present invention;

DESCRIPTION OF THE PREFERRED EMBODIMENTS

Figure 1:
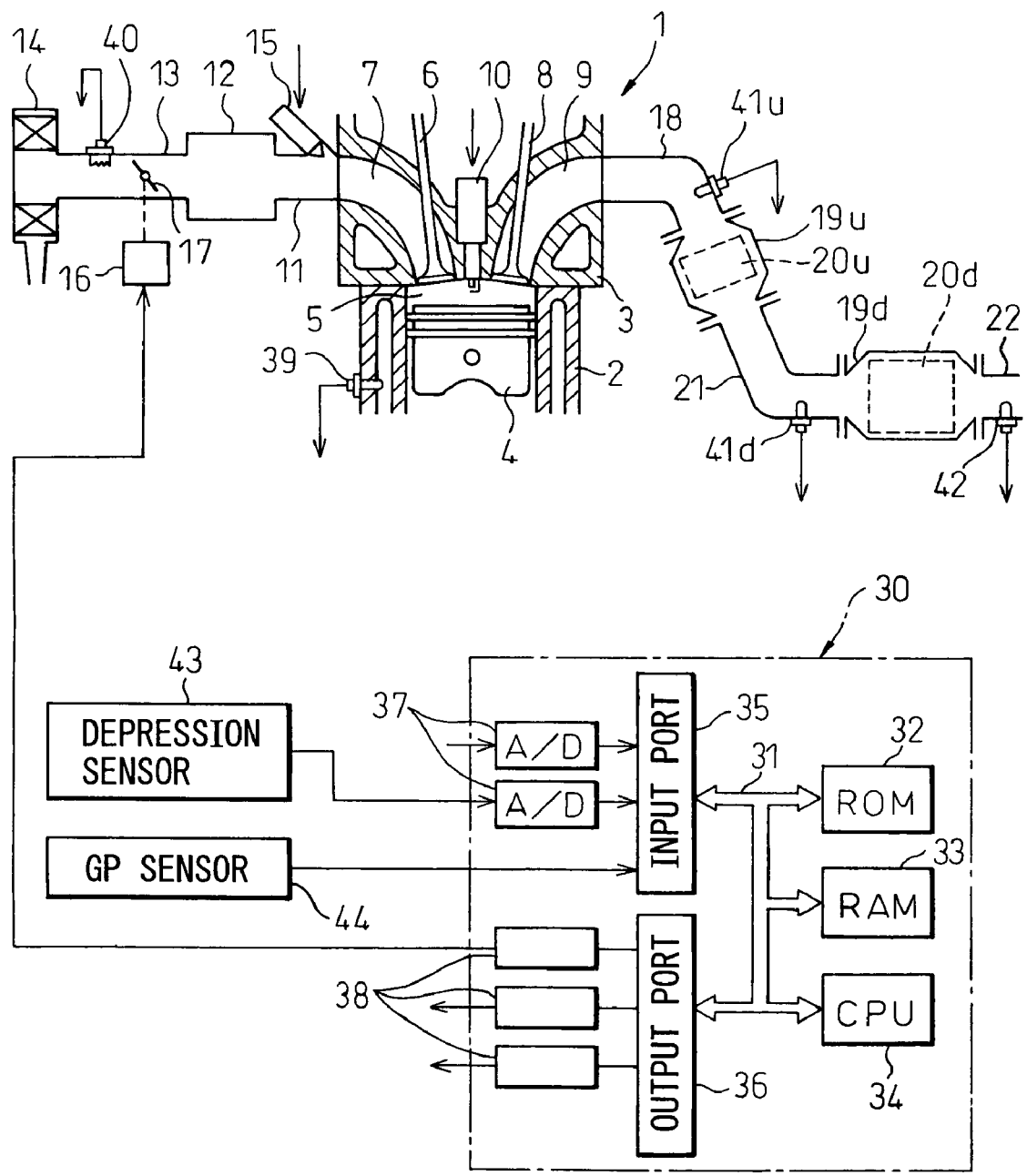
FIG. 1 is an overall view of an internal combustion engine.

Referring to FIG. 1, the numeral 1 designates an engine body having for example four cylinders, 2 a cylinder block, 3 a cylinder head, 4 a piston, 5 a combustion chamber, 6 an intake valve, 7 an intake port, 8 an exhaust valve, 9 an exhaust port, and 10 a spark plug. Each intake port 7 is connected through an intake branch 11 to the surge tank 12, while the surge tank 12 is connected through an intake duct 13 to an air cleaner 14. Each intake branch 11 has a fuel injector 15 arranged inside it, while the intake duct 13 has a throttle valve 17 driven by a step motor 16 arranged inside it.

On the other hand, each exhaust port 9 is connected through an exhaust manifold to an upstream-side casing 19$u$. This upstream-side casing 19$u$ houses inside it a relatively small capacity upstream-side catalyst 20$u$. Further, the upstream-side casing 19$u$ is connected through an exhaust pipe 21 to a downstream-side casing 19$d$. This downstream-side casing 19$d$ houses inside it a relatively large capacity downstream-side catalyst 20$d$. Further, the downstream-side casing 19$d$ is connected to an exhaust pipe 22. These upstream-side catalyst 20$u$ and downstream-side catalyst 20$d$ are comprised of three-way catalysts including platinum Pt and ceria $CeO_2$.

An electronic control unit 30 is comprised of a digital computer and is provided with a ROM (read only memory) 32, RAM (random access memory) 33, CPU (microprocessor) 34, input port 35, and output port 36 all connected by a bidirectional bus 31. The engine body 1 has a water temperature sensor 39 attached to it for detecting the engine coolant water temperature, while the intake duct 13 has an air flow meter 40 attached to it for detecting a mass flow rate of intake air (hereinafter referred to as the "intake air amount"). Further, the exhaust manifold 18 and exhaust pipe 21 have an upstream-side air-fuel ratio sensor 41$u$ and a downstream-side air-fuel ratio sensor 41$d$ attached to them, respectively, while the exhaust pipe 22 has an exhaust temperature sensor 42 attached to it to detect the temperature of the exhaust gas exhausted from the downstream-side catalyst 20$d$. Note that the temperature of the exhaust gas exhausted from the downstream-side catalyst 20$d$ expresses the temperature of the downstream-side catalyst 20$d$. Further, an accelerator pedal (not shown) has a depression sensor 43 connected to it to detect an amount of depression DEP of the accelerator pedal. The output voltages of these sensors 39, 40, 41, 42, and 43 are input through the corresponding AD converters 37 to the input port 35. Further, the input port 35 has a crank angle sensor 44 connected to it for generating an output pulse every time a crankshaft rotates by for example 30°. The CPU 34 calculates the engine speed N based on this output pulse. On the other hand, the output port 36 has spark plugs 10, fuel injectors 15, and step motor 16 connected to it through corresponding drive circuits 38. Note that the combustion sequence of the internal combustion engine shown in FIG. 1 is #1-#3-#4-#2.

Figure 2:
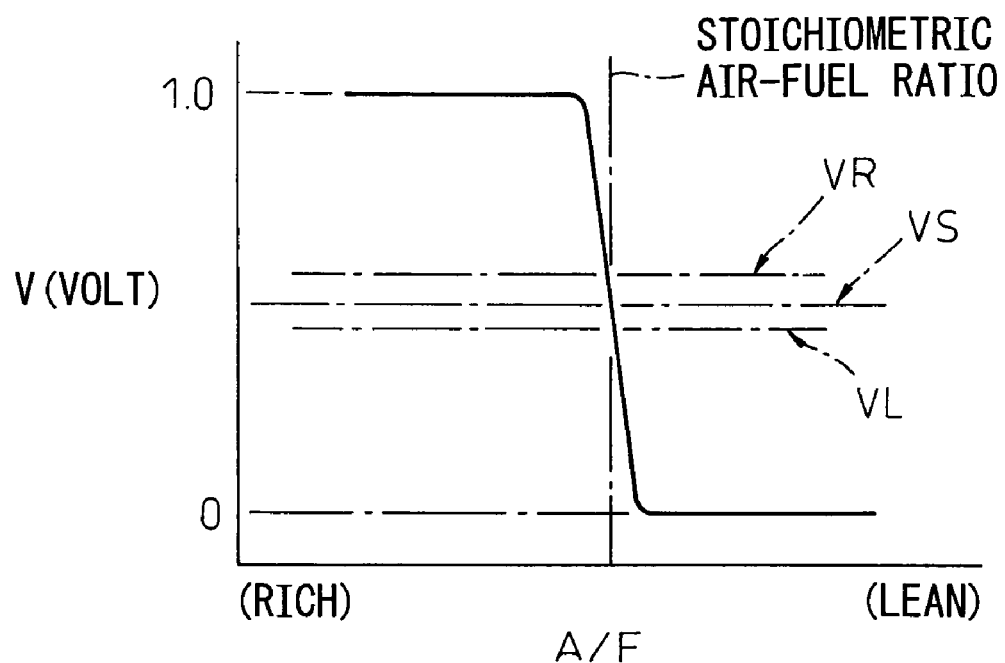
FIG. 2 is a diagram of an output voltage of an air-fuel ratio sensor.

The upstream-side air-fuel ratio sensor 41$u$ and the downstream-side air-fuel ratio sensor 41$d$ used are oxygen concentration sensors changing in output voltage in accordance with the concentration of oxygen in the exhaust gas. The output voltage V of such an oxygen concentration sensor, as shown in FIG. 2, becomes VS of about 0.5 Volt when the air-fuel ratio is the stoichiometric air-fuel ratio, becomes about 1.0 Volt when the air-fuel ratio becomes rich, and becomes about 0 Volt when the air-fuel ratio becomes lean. As will be understood from FIG. 2, if the air-fuel ratio fluctuates across the stoichiometric air-fuel ratio, the output voltage V of an oxygen concentration sensor sharply changes.

In the embodiments according to the present invention, the fuel injection time TAU is calculated by the following equation:

$$TAU = TB \cdot INC \cdot FAF$$

where, TB is a basic fuel injection time, INC is a fuel increase correction coefficient, and FAF is a feedback correction coefficient.

Figure 3:
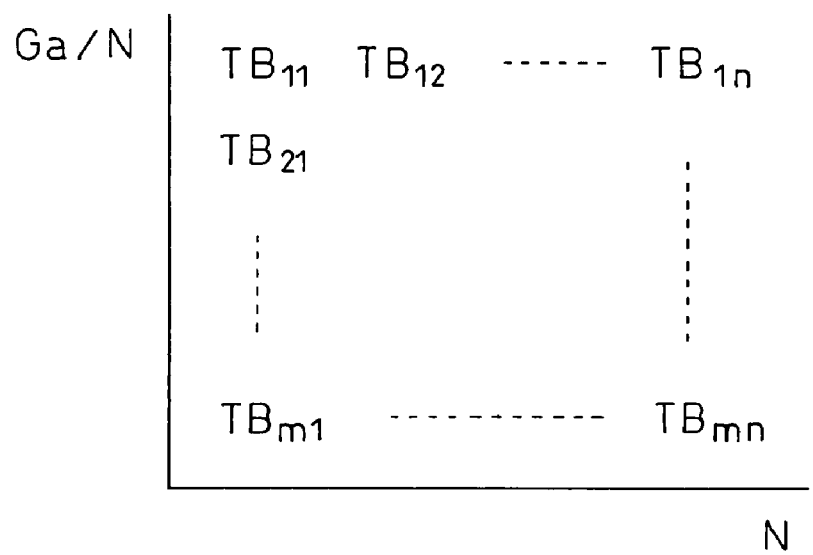
FIG. 3 is a diagram of a basic fuel injection time TB.

The basic fuel injection time TB is the fuel injection time required for making the air-fuel ratio match the stoichiometric air-fuel ratio and is for example, as shown in FIG. 3, stored in advance in the ROM 32 as a function of the engine load L (=intake air amount Ga/engine speed N) and the engine speed N.

The fuel increase correction coefficient INC shows all together for example a warmup increase correction coefficient for correcting the fuel increase at the time of a warmup operation, a high load increase correction coefficient for correcting the fuel increase when the required load is high, a high temperature increase correction coefficient for correcting the fuel increase so as to prevent thermal deterioration of the downstream-side catalyst 20d when the temperature of the downstream-side catalyst 20d is high, etc. and is held at 1.0 when there is no need for correcting the fuel increase.

The feedback correction coefficient FAF is for making the average air-fuel ratio match with the target air-fuel ratio based on the output of the upstream-side air-fuel ratio sensor 41u. When open loop control is being performed such as when correcting the fuel increase, it is held at 1.0.

Here, the method of calculation of the feedback correction coefficient FAF will be explained briefly with reference to FIG. 4 and FIG. 5.

Figure 4:
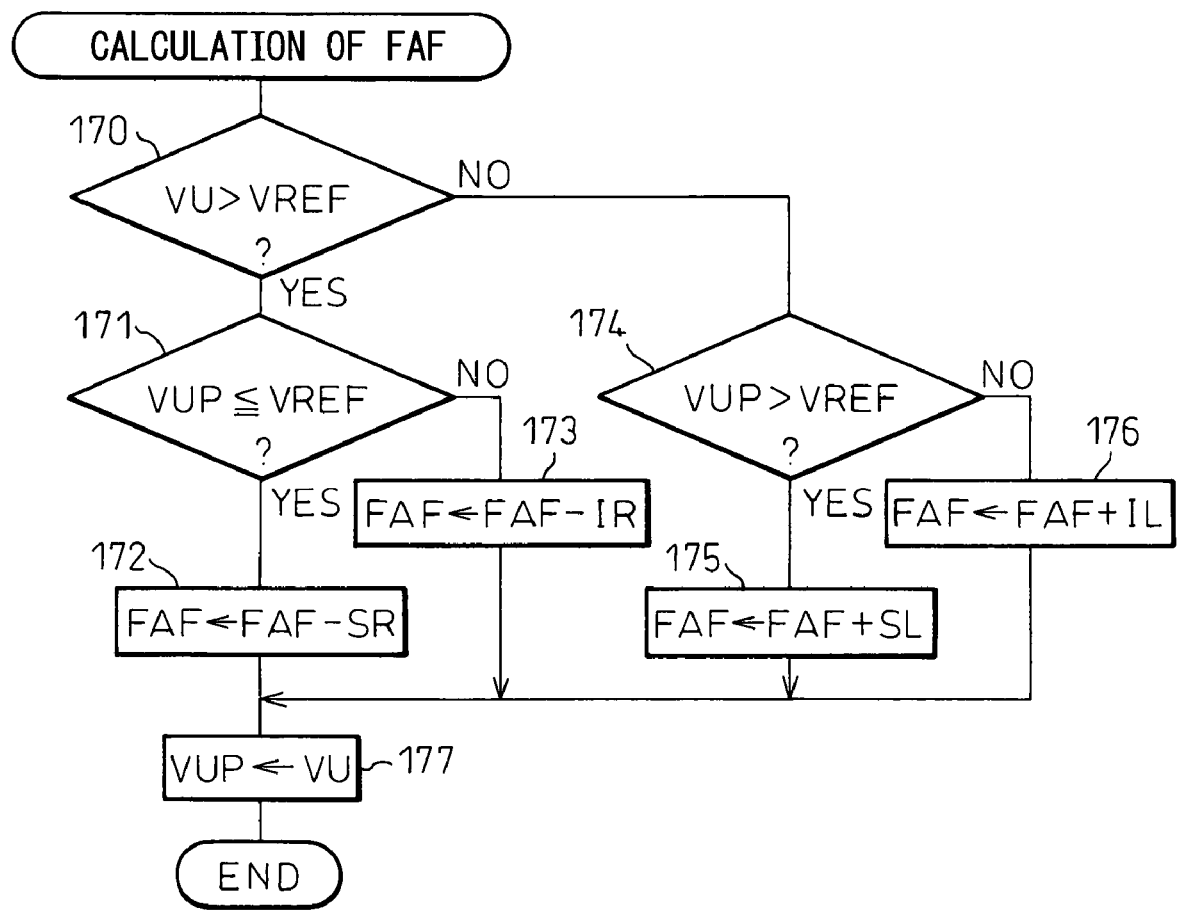
FIG. 4 is a flow chart of a routine for calculation of a feedback correction coefficient FAF.

FIG. 4 shows the routine for calculation of the feedback correction coefficient FAF. Referring to FIG. 4, at step 170, whether the output voltage VU of the upstream-side air-fuel ratio sensor 41u is higher than a reference voltage VREF, that is, whether the air-fuel ratio is richer compared with the reference air-fuel ratio expressed by the reference voltage VREF, is judged. When VU>VREF, next the routine proceeds to step 171 where whether the output voltage VU of the upstream-side air-fuel ratio sensor 41u at the previous processing cycle was the reference voltage VREF or less, that is, whether the air-fuel ratio at the previous processing cycle was leaner than the reference air-fuel ratio, is judged. When VUP≦VREF, that is, when the air-fuel ratio has switched from lean to rich with respect to the reference air-fuel ratio, next the routine proceeds to step 172 where the feedback correction coefficient FAF is decreased by exactly a skip value SR. As a result, as shown in FIG. 5, the feedback correction coefficient FAF is rapidly decreased. Next, the routine proceeds to step 177. As opposed to this, when VUP>VREF, that is, when the air-fuel ratio continues to be richer than the reference air-fuel ratio, next the routine proceeds to step 173 where the feedback correction coefficient FAF is decreased by exactly an integration value IR (<<SR). As a result, as shown in FIG. 5, the feedback correction coefficient FAF is gradually decreased. Next, the routine proceeds to step 177.

On the other hand, when VU≦VREF at step 170, that is, when the air-fuel ratio is leaner than the reference air-fuel ratio, next the routine proceeds to step 174 where whether the output voltage VU of the upstream-side air-fuel ratio sensor 41u at the previous processing cycle was higher than the reference voltage VREF, that is, whether the air-fuel ratio at the previous processing cycle was leaner than the reference air-fuel ratio, is judged. When VUP>VREF, that is, when the air-fuel ratio is switched from rich to lean with respect to the reference air-fuel ratio, next the routine proceeds to step 175 where the feedback correction coefficient FAF is increased by exactly the skip valve SL. As a result, as shown in FIG. 5, the feedback correction coefficient FAF rapidly increases. Next, the routine proceeds to step 177. As opposed to this, when VUP≦VREF, that is, when the air-fuel ratio continues to be leaner than the reference air-fuel ratio, next the routine proceeds to step 176 where the feedback correction coefficient FAF is increased by exactly the integration value IL (<<SL). As a result, as shown in FIG. 5, the feedback correction coefficient FAF is gradually increased. Next, the routine proceeds to step 177.

At step 177, the output voltage VU of the upstream-side air-fuel ratio sensor 41u at the previous processing cycle is stored as VUP.

The air-fuel ratio corrected by the feedback correction coefficient FAF in this way fluctuates substantially symmetrically about the reference air-fuel ratio expressed by the reference voltage VREF, and the average air-fuel ratio in this case matches with the reference air-fuel ratio expressed by the reference voltage VREF. Therefore, if setting the voltage corresponding to the target air-fuel ratio to the reference voltage VREF, it becomes possible to make the average air-fuel ratio match the target air-fuel ratio. That is, when the target air-fuel ratio is the stoichiometric air-fuel ratio, the reference voltage VREF is set to the voltage VS corresponding to the stoichiometric air-fuel ratio (see FIG. 2).

The three-way catalysts 20u and 20d have oxygen storing capabilities. Therefore, if making the air-fuel ratio rich, NOx will be reduced well at the three-way catalysts 20u and 20d and at that time the unburned HC and CO will be oxidized by the oxygen stored in the three-way catalysts 20u and 20d. However, as time passes, the amounts of stored oxygen of the three-way catalysts 20u and 20d are decreased. As opposed to this, if making the air-fuel ratio lean, the unburned HC and CO are oxidized well at the three-way catalysts 20u and 20d and the amounts of stored oxygen of the three-way catalysts 20u and 20d are increased. On the other hand, considering the fact that the three components of the NOx, unburned HC, and CO are simultaneously purified by the three-way catalysts, it is not preferable to allow the air-fuel ratio to greatly deviate from the stoichiometric air-fuel ratio.

Therefore, in a first embodiment according to the present invention, "slight rich" control is performed so as to control the air-fuel ratio so that the average air-fuel ratio becomes slightly richer than stoichiometric air-fuel ratio. When the amounts of stored oxygen of the three-way catalysts 20u and 20d become smaller, "slight lean" control is performed so as to control the air-fuel ratio so that the average air-fuel ratio becomes slightly leaner than the stoichiometric air-fuel ratio.

That is, in the first embodiment according to the present invention, a representative upstream-side stored oxygen value OXU representing the amount of stored oxygen of the upstream-side catalyst 20u and a representative downstream-side stored oxygen value OXD representing the amount of stored oxygen of the downstream-side catalyst 20d are found. When slight rich control is performed, the representative upstream-side stored oxygen value OXU and representative downstream-side stored oxygen value OXD gradually decrease. Next, when the representative upstream-side stored oxygen value OXU becomes smaller than the corresponding allowable lower limit LLU or the representative downstream-side stored oxygen value OXD becomes smaller than the corresponding lower limit LLD, slight lean control is switched to. If slight lean control is performed, the representative upstream-side stored oxygen value OXU and representative downstream-side stored oxygen value OXD gradually increase. Next, when the representative upstream-side stored oxygen value OXU becomes larger than the corresponding allowable upper limit ULU or the representative downstream-side stored oxygen value OXD becomes larger than the corresponding upper limit ULD, slight rich control is returned to.

In other words, the air-fuel ratio is controlled so that the amount of stored oxygen of the upstream-side catalyst 20u becomes within a target range determined by the allowable lower limit LLU and the allowable upper limit ULU or so that the amount of stored oxygen of the downstream-side catalyst 20*d* becomes within the target range determined by the allowable lower limit LLD and allowable upper limit ULD, whereby the amounts of stored oxygen of the upstream-side catalyst 20*u* and downstream-side catalyst 20*d* are controlled. As a result, it is possible to efficiently purify the three components of the NOx, unburned HC, and CO.

Figure 6A:
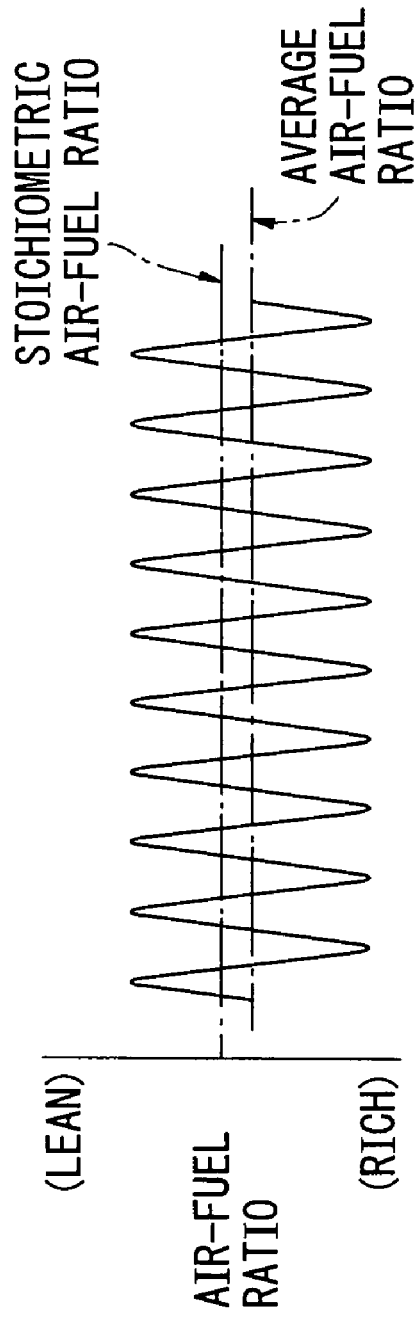
FIGS. 6A and 6B are views for explaining "slight rich" control and "slight lean" control.
Figure 6B:
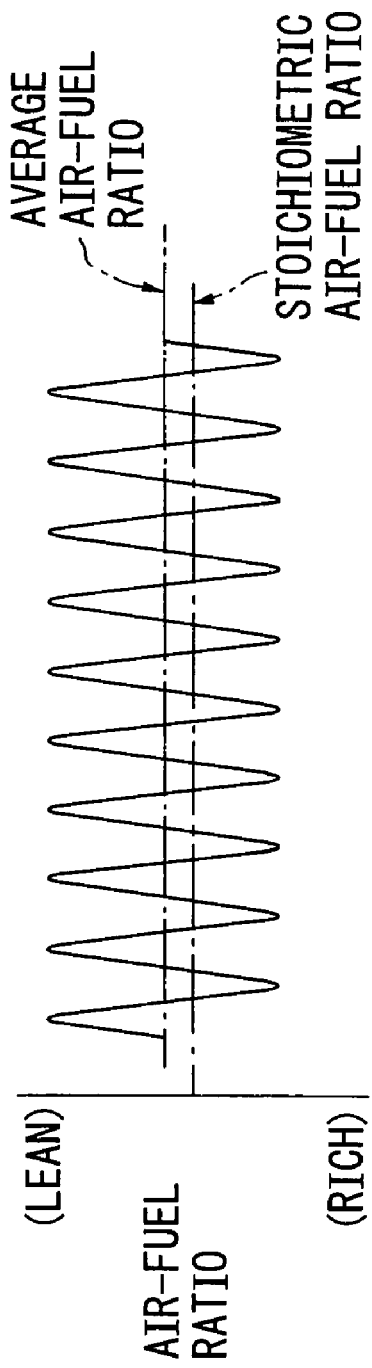

At the time of slight rich control, the reference voltage VREF mentioned above with reference to FIG. 4 and FIG. 5 is set to a voltage VR slightly higher than the VS corresponding to the stoichiometric air-fuel ratio (see FIG. 2), while at the time of slight lean control, it is set to the voltage VL slightly lower than the VS corresponding to the stoichiometric air-fuel ratio (see FIG. 2). Note that the behavior of the air-fuel ratio at the time of slight rich control is shown in FIG. 6A, while the behavior of the air-fuel ratio at the time of slight lean control is shown in FIG. 6B.

Accurate switching between the slight rich control and slight lean control requires that the representative upstream-side stored oxygen value OXU and representative downstream-side stored oxygen value OXD be accurately found.

In the first embodiment according to the present invention, the changes $\Delta$OXU and $\Delta$OXD of the representative upstream-side stored oxygen value OXU and representative downstream-side stored oxygen value OXD are repeatedly found. By cumulatively adding these changes $\Delta$OXU and $\Delta$OXD, the representative upstream-side stored oxygen value OXU and representative downstream-side stored oxygen value OXD are found (OXU=OXU+$\Delta$OXU, OXD=OXD+$\Delta$OXD). Based on this, the changes $\Delta$OXU and $\Delta$OXD are calculated as follows.

First, at the time of slight rich control, the unburned HC and CO contained in the exhaust gas at that time cause the representative upstream-side stored oxygen value OXU and representative downstream-side stored oxygen value OXD to decrease. These decreases are proportional to the intake air amount Ga. Therefore, at the time of slight rich control, the intake air amount Ga and weighting coefficients KRU and KRD (>0) are used to calculate the changes $\Delta$OXU and $\Delta$OXD based on the following equations:

$$\Delta OXU = -Ga \cdot KRU$$

$$\Delta OXD = -Ga \cdot KRD$$

However, the average air-fuel ratio at the time of slight rich control is slightly rich, so for a little while after switching from slight lean control to slight rich control, the air-fuel ratio detected by the downstream-side air-fuel ratio sensor 41*d* will sometimes be lean. In this case, the representative downstream-side stored oxygen value OXD will not be decreased, but will rather increase. Therefore, in this case, the weighting coefficient KRC (>0) is used to calculate the change $\Delta$OXD of the representative downstream-side stored oxygen value OXD based on the following equation:

$$\Delta OXD = Ga \cdot KRC$$

Note that the weighting coefficients KRU and KRD may be the same values or different values and that KRD and KRC may also be the same values or different values.

As opposed to this, at the time of slight lean control, the oxygen contained in the exhaust gas at that time causes the representative upstream-side stored oxygen value OXU and representative downstream-side stored oxygen value OXD to increase. Therefore, at the time of slight lean control, the weighting coefficients KLU and KLD (>0) are used to calculate the $\Delta$OXU and $\Delta$OXD based on the following equations:

$$\Delta OXU = Ga \cdot KLU$$

$$\Delta OXD = Ga \cdot KLD$$

However, the average air-fuel ratio at the time of slight lean control is slightly lean, so for a little while after switching from slight rich control to slight lean control, the air-fuel ratio detected by the downstream-side air-fuel ratio sensor 41*d* will sometimes be rich. In this case, the representative downstream-side stored oxygen value OXD will increase. In such a case, the weighting coefficient KLC (>0) is used to calculate the change $\Delta$OXD of the representative downstream-side stored oxygen value OXD based on the following equation:

$$\Delta OXD = -Ga \cdot KLC$$

Note that the weighting coefficients KLU and KLD may be the same values or different values and that KLD and KLC may also be the same values or different values.

On the other hand, at the time of fuel increase correction, the representative upstream-side stored oxygen value OXU and representative downstream-side stored oxygen value OXD decrease. These decreases are proportional to the intake air amount Ga and the above-mentioned fuel increase coefficient INC. Therefore, at the time of fuel increase correction, the weighting coefficients KINCU and KINCD (>0) are used to calculate the changes $\Delta$OXU and $\Delta$OXD based on the following equations:

$$\Delta OXU = -(Ga \cdot KINCU) \cdot INC$$

$$\Delta OXD = -(Ga \cdot KINCD) \cdot INC$$

However, when despite the fuel increase control, the air-fuel ratio detected by the downstream-side air-fuel ratio sensor 41*d* is lean, the change $\Delta$OXD of the representative downstream-side stored oxygen value OXD is made zero ($\Delta$OXD=0). When the fuel increase correction is being performed, the air-fuel ratio is considerably rich and probably the air-fuel ratio detected by the downstream-side air-fuel ratio sensor 41*d* will almost never become lean. Therefore, in this case, making the change $\Delta$OXD zero would enable the representative downstream-side stored oxygen value OXD to be found more accurately.

Note that the weighting coefficients KINCU and KINCD may be the same values or different values.

Further, in the internal combustion engine shown in FIG. 1, the fuel to the engine is temporarily cut at the time of an engine deceleration operation. When the fuel to the engine is cut, air or oxygen passes through the combustion chambers 5 and flow into the upstream-side catalyst 20*u* and downstream-side catalyst 20*d*. Therefore, when fuel to the engine is cut, weighting coefficients KFCU and KFCD (>0) are used to calculate the changes $\Delta$OXU and $\Delta$OXD based on the following equations:

$$\Delta OXU = Ga \cdot KFCU$$

$$\Delta OXD = Ga \cdot KFCD$$

However, when despite the fuel to the engine being cut, the air-fuel ratio detected by the downstream-side air-fuel ratio sensor 41*d* is rich, the change $\Delta$OXD of the representative downstream-side stored oxygen value OXD is made zero ($\Delta$OXD=0).

In this way, in the first embodiment according to the present invention, the representative upstream-side stored oxygen value OXU is found based on the control state of the engine, that is, based on whether the control state of the engine is slight rich control, slight lean control, fuel increase correction, or fuel cut to the engine. As opposed to this, the representative downstream-side stored oxygen value OXD is found based on the engine control state and the output of the downstream-side air-fuel ratio sensor 41d. On this point, it may be deemed that the representative downstream-side stored oxygen value OXD found based on the engine control state is corrected based on the output of the downstream-side air-fuel ratio sensor 41d.

Note that there are limits to the amounts of oxygen which the upstream-side catalyst 20u and the downstream-side catalyst 20d can actually store, that is, the amounts of stored oxygen of the upstream-side catalyst 20u and downstream-side catalyst 20d will never become smaller than their corresponding smallest possible amounts and will never become larger than their corresponding largest possible amounts. Therefore, when the calculated representative stored oxygen values OXU and OXD become smaller than the minimum possible amounts OXUm and OXDm corresponding to the above smallest possible amounts (for example zero), the representative stored oxygen values OXU and OXD are returned to their minimum possible values OXUm and OXDm, while when the calculated representative stored oxygen values OXU and OXD become larger than the maximum possible amounts OXUM and OXDM corresponding to the above largest possible amounts, the representative stored oxygen values OXU and OXD are returned to their maximum possible values OXUM and OXDM. Below, this processing will be referred to as "guard processing".

Figure 7:
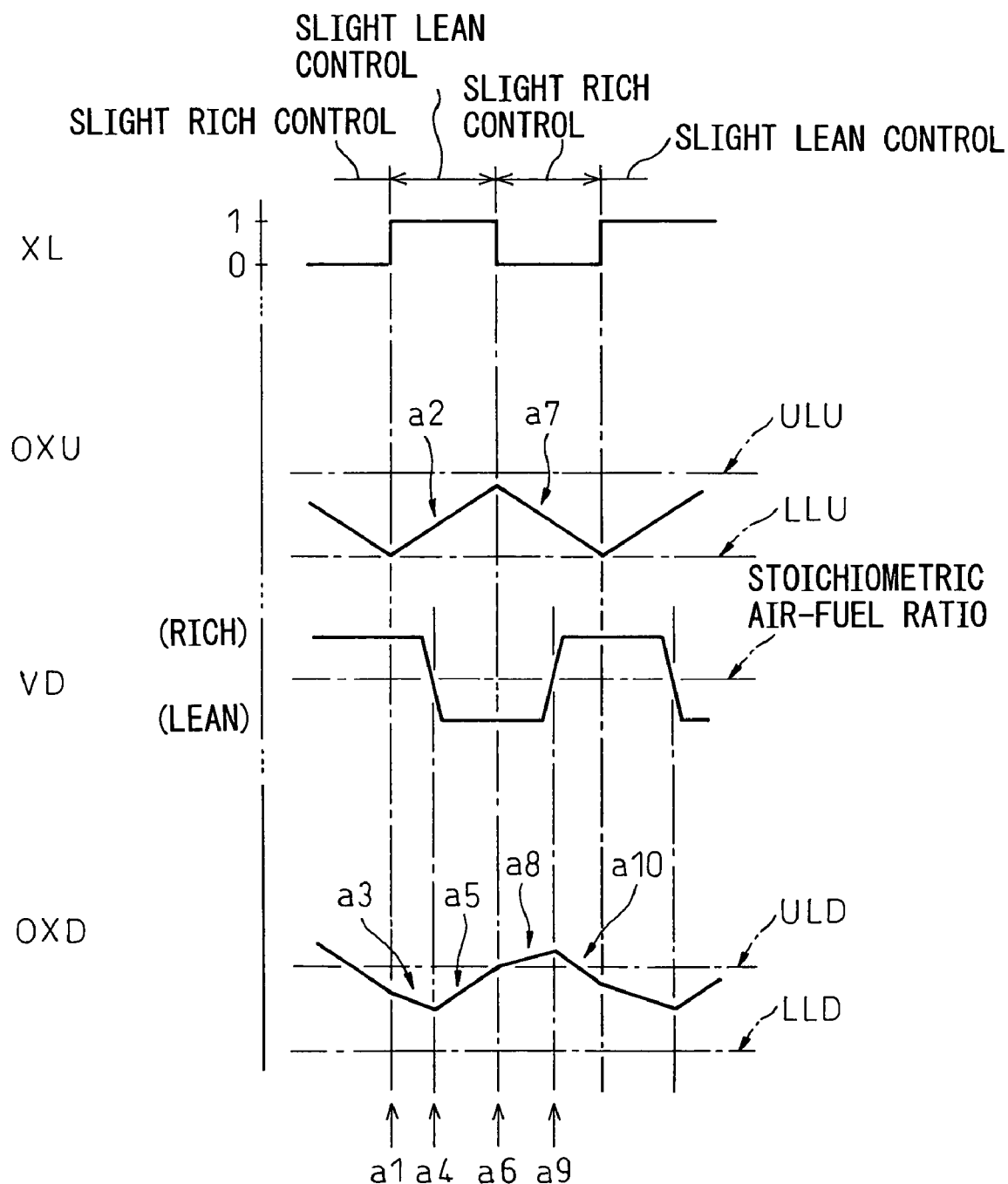
FIG. 7 is a time chart for explaining the first embodiment according to the present invention.
Figure 8:
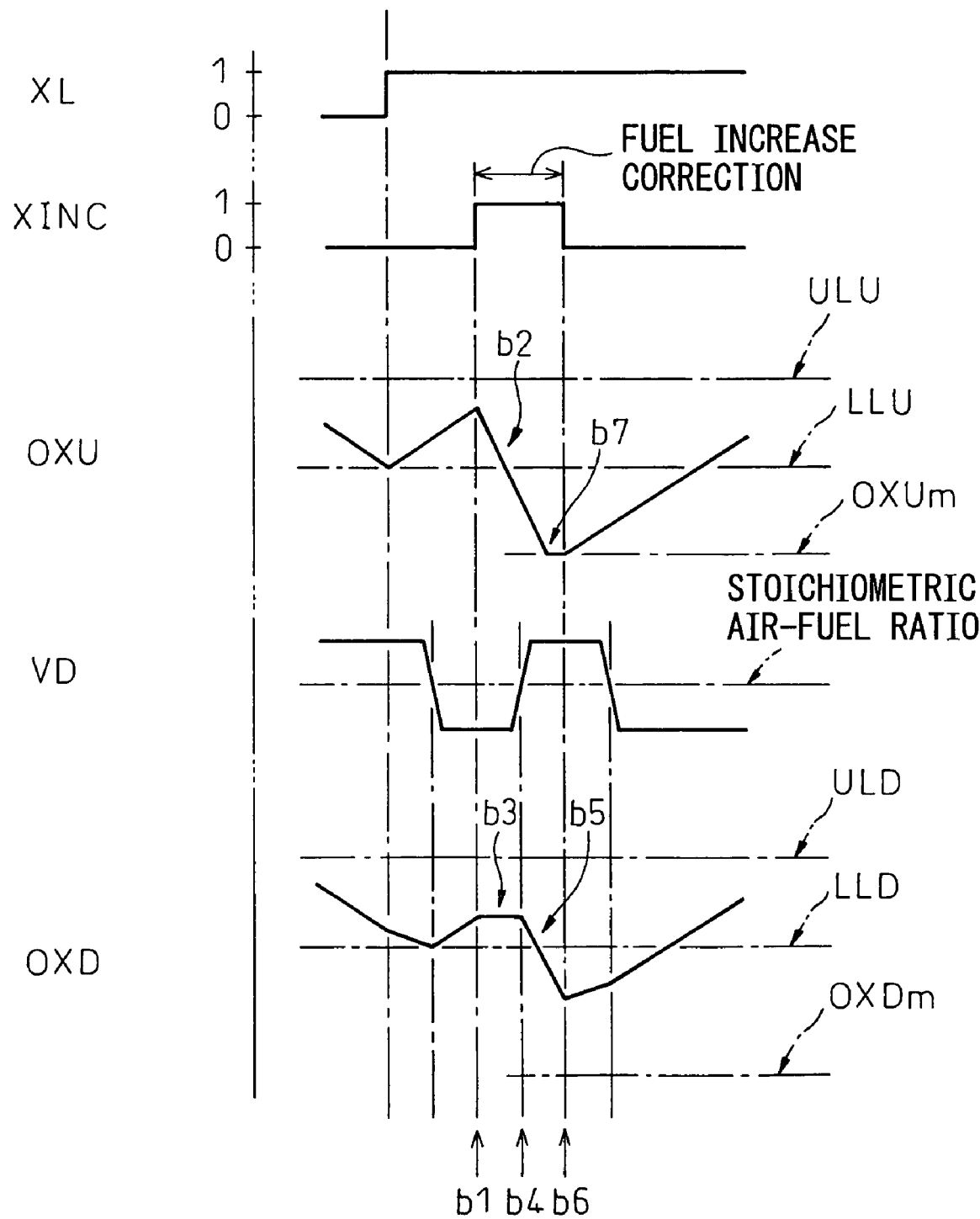
FIG. 8 is a time chart for explaining the first embodiment according to the present invention.
Figure 9:
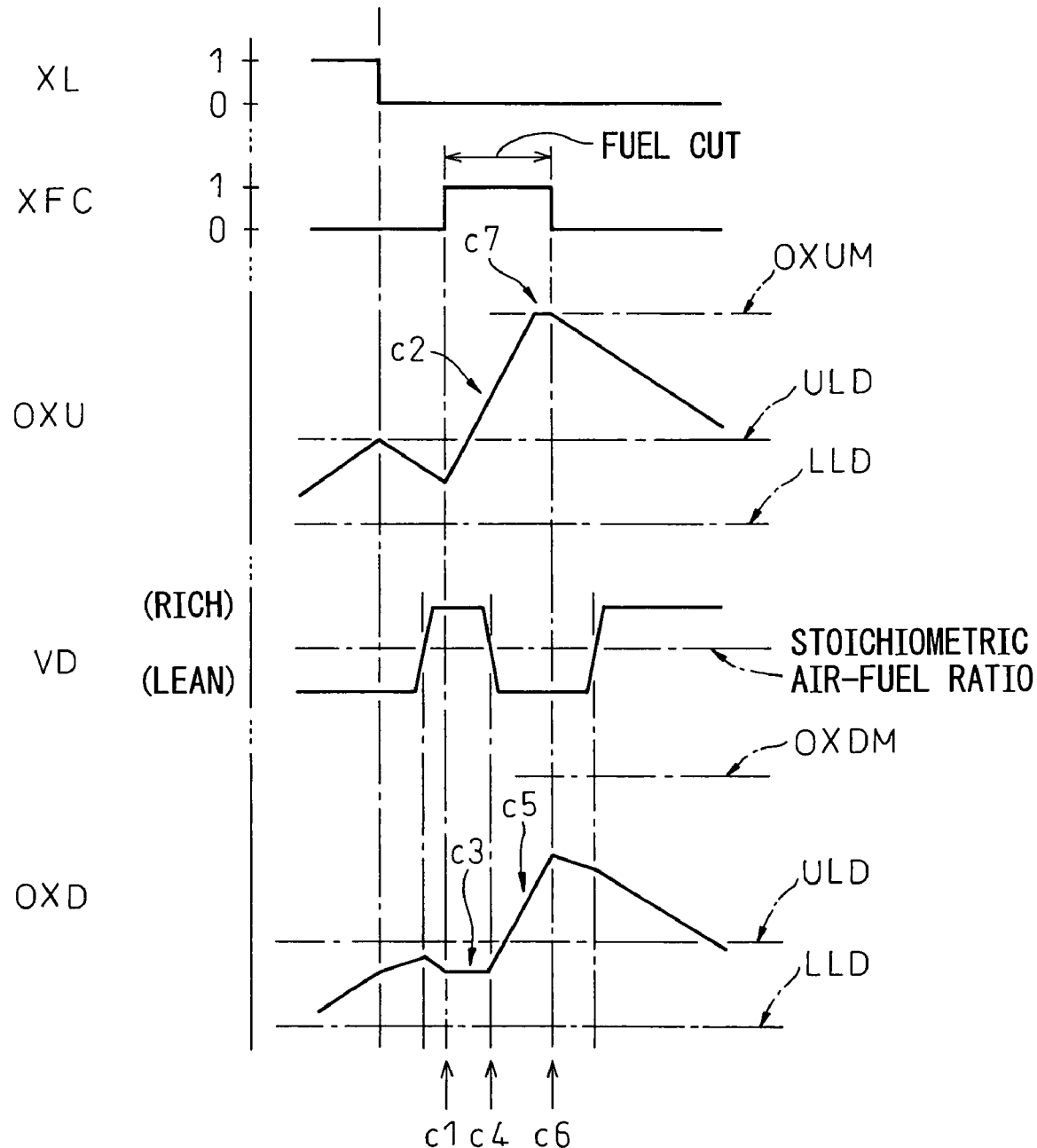
FIG. 9 is a time chart for explaining the first embodiment according to the present invention.

Next, the first embodiment according to the present invention will be explained further while referring to FIG. 7 to FIG. 9. In FIG. 7 to FIG. 9, XL indicates a lean flag, VD the output voltage of the downstream-side air-fuel ratio sensor 41d, XINC a fuel increase correction flag, and XFC a fuel cut flag. The lean flag XL is set (XL=1) when slight lean control is to be performed and is reset (XL=0) when slight rich control is to be performed. The fuel increase correction flag XINC is set (XINC=1) when fuel increase correction is to be performed, and is reset (XINC=0) otherwise. The fuel cut flag XFC is set (XFC=1) when fuel to the engine is to be cut, and is reset (XFC=0) otherwise. The fuel cut flag FXC is set (XFC=1) when fuel to the engine is to be cut, while is reset (XFC=1) otherwise.

Referring to the example shown in FIG. 7, for example, when the lean flag XL is reset (XL=0) and therefore slight rich control is being performed, if the representative upstream-side stored oxygen value OXU becomes smaller than the allowable lower limit LLU (see a1 of FIG. 7), the lean flag XL is set (XL=1) and therefore slight lean control is switched to. When slight lean control is being performed, the representative upstream-side stored oxygen value OXU is increased by Ga·KLU at a time (see a2 of FIG. 7), while the representative downstream-side stored oxygen value OXD is decreased by Ga·KLC at a time while the air-fuel ratio detected by the downstream-side air-fuel ratio sensor 41d is rich (see a3 of FIG. 7) and is increased by Ga·KLD at a time (see a5 of FIG. 7) when the air-fuel ratio detected by the downstream-side air-fuel ratio sensor 41d is switched to lean (see a4 of FIG. 7).

Next, for example when the representative downstream-side stored oxygen value OXD becomes larger than its allowable upper limit ULD (see a6 of FIG. 7), the lean flag XL is reset (XL=0) and therefore slight rich control is switched to. When slight rich control is being performed, the representative upstream-side stored oxygen value OXU is decreased by Ga·KRU at a time (see a7 of FIG. 7). On the other hand, the representative downstream-side stored oxygen value OXD is increased by Ga·KRC at a time (see a8 of FIG. 7) while the air-fuel ratio detected by the downstream-side air-fuel ratio sensor 41d is lean and is decreased by Ga·KRD at a time (see a10 of FIG. 7) when the air-fuel ratio detected by the downstream-side air-fuel ratio sensor 41d is switched to rich (see a9 of FIG. 7).

Next, referring to the example shown in FIG. 8, when the fuel increase correction flag XINC is set (XINC=1) and therefore the fuel increase correction is started (see b1 of FIG. 8), the representative upstream-side stored oxygen value OXU is decreased rapidly by (Ga·KINCU)·INC at a time (see b2 of FIG. 8). On the other hand, the representative downstream-side stored oxygen value OXD is held constant while the air-fuel ratio detected by the downstream-side air-fuel ratio sensor 41d is lean (see b3 of FIG. 8). When the air-fuel ratio detected by the downstream-side air-fuel ratio sensor 41d is switched to rich (see b4 of FIG. 8), the value OXU is rapidly reduced by (Ga·KINCD)·INC at a time (see b5 of FIG. 8). Next, when the fuel increase correction flag XINC is reset (XINC=0) and therefore the fuel increase correction is stopped (see b6 of FIG. 8), for example slight lean control is restarted and the representative upstream-side stored oxygen value OXU and representative downstream-side stored oxygen value OXD are increased.

Note that b7 of FIG. 8 shows the case where guard processing is performed. In this example, the representative upstream-side stored oxygen value OXU is limited to the minimum possible value OXUm.

Further, referring to the example shown in FIG. 9, when the fuel cut flag XFC is set (XFC=1) and therefore the fuel to the engine is cut (see c1 of FIG. 9), the representative upstream-side stored oxygen value OXU is rapidly increased by Ga·KFCU at a time (see c2 of FIG. 9). On the other hand, the representative downstream-side stored oxygen value OXD is held constant while the air-fuel ratio detected by the downstream-side air-fuel ratio sensor 41d is rich (see c3 of FIG. 9) and, as the air-fuel ratio detected by the downstream-side air-fuel ratio sensor 41d is switched to lean (see c4 of FIG. 9), it is rapidly increased by Ga·KFCD at a time (see c5 of FIG. 9). Next, when the fuel cut flag XFC is reset (XFC=0) and therefore the fuel to the engine is resumed (see c6 of FIG. 9), for example the slight rich control is restarted and the representative upstream-side stored oxygen value OXU and representative downstream-side stored oxygen value OXD are decreased.

Note that c7 of FIG. 9 shows the case where guard processing is performed. In this example, the representative upstream-side stored oxygen value OXU is limited to the maximum possible value OXUM.

Figure 10:
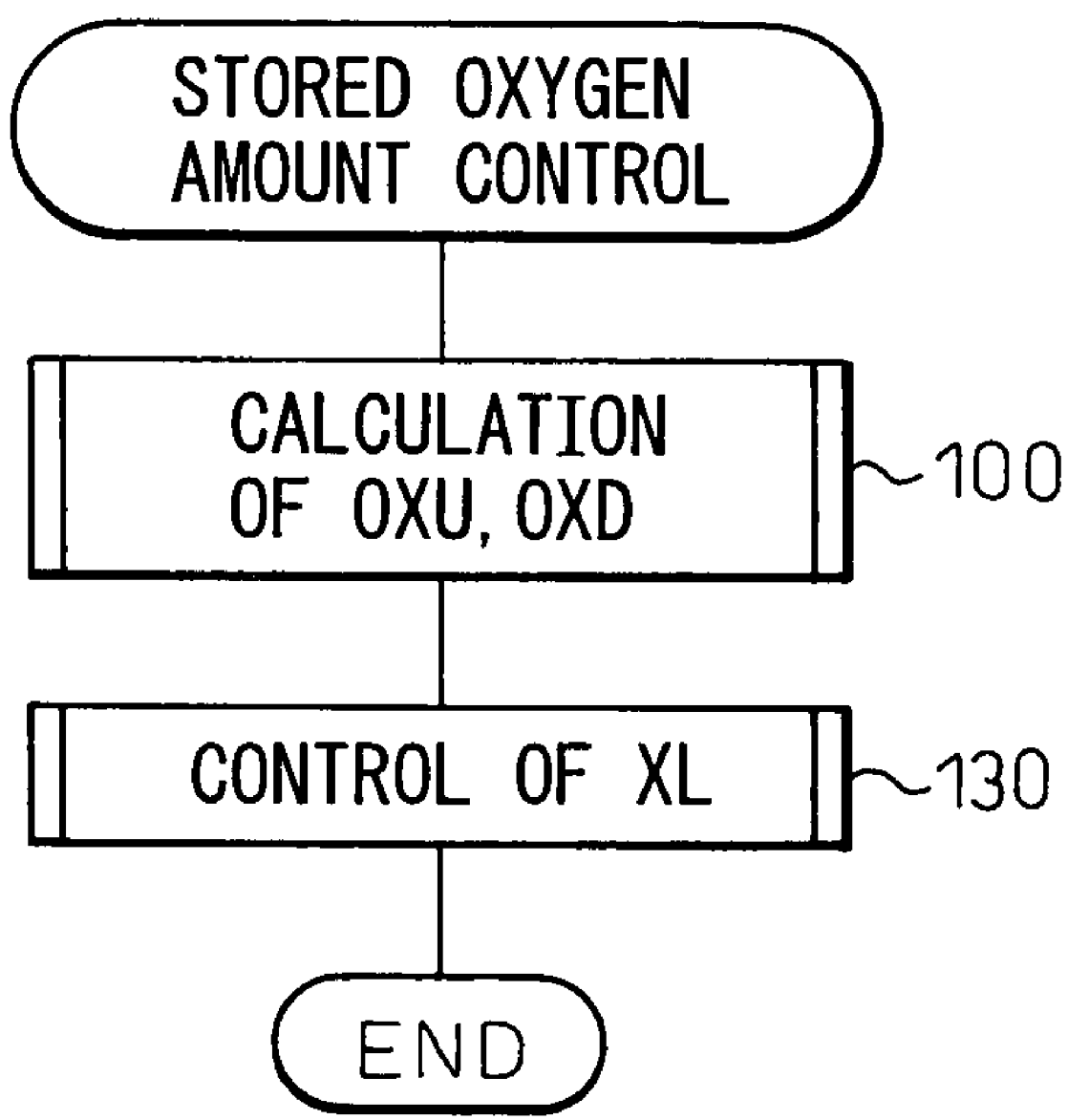
FIG. 10 is a flow chart of a routine for control of the amount of stored oxygen of the first embodiment according to the present invention.

FIG. 10 shows a routine for control of the amount of stored oxygen of the first embodiment according to the present invention. This routine is executed by interruption every predetermined set time.

Figure 11:
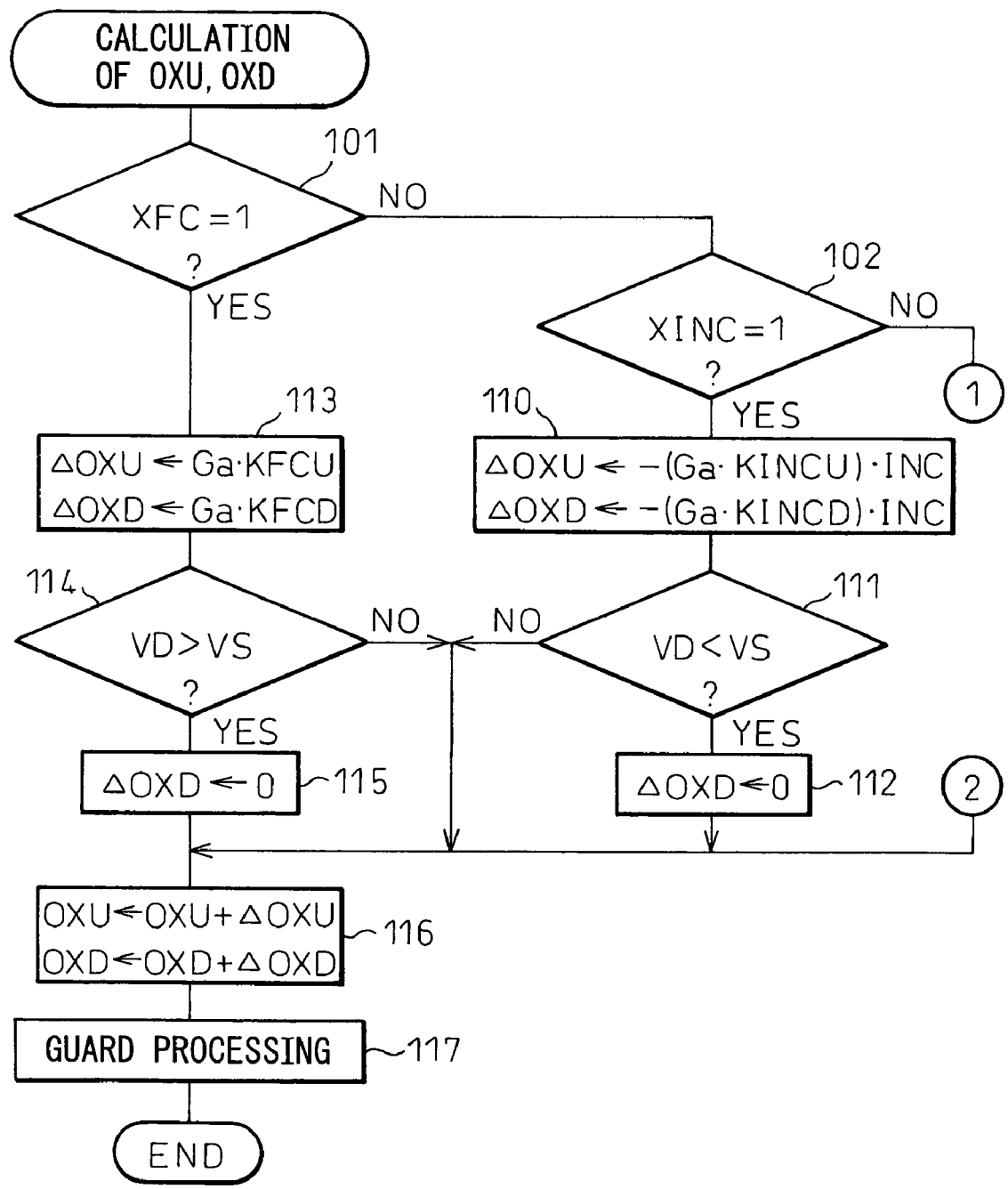
FIG. 11 is a flow chart of a routine for calculation of representative stored oxygen values OXU and OXD of the first embodiment according to the present invention.
Figure 12:
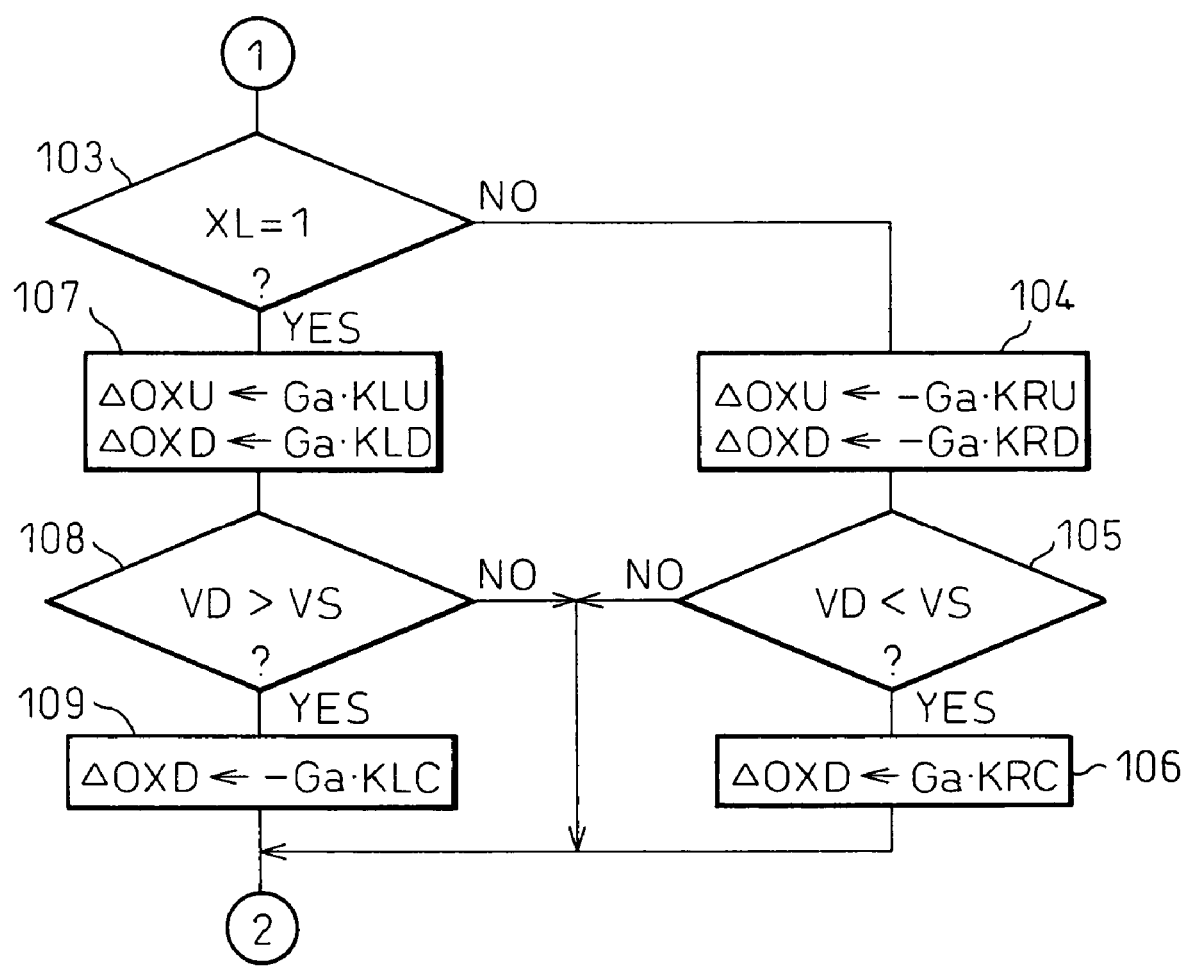
FIG. 12 is a flow chart of a routine for calculation of representative stored oxygen values OXU and OXD of the first embodiment according to the present invention.
Figure 13:
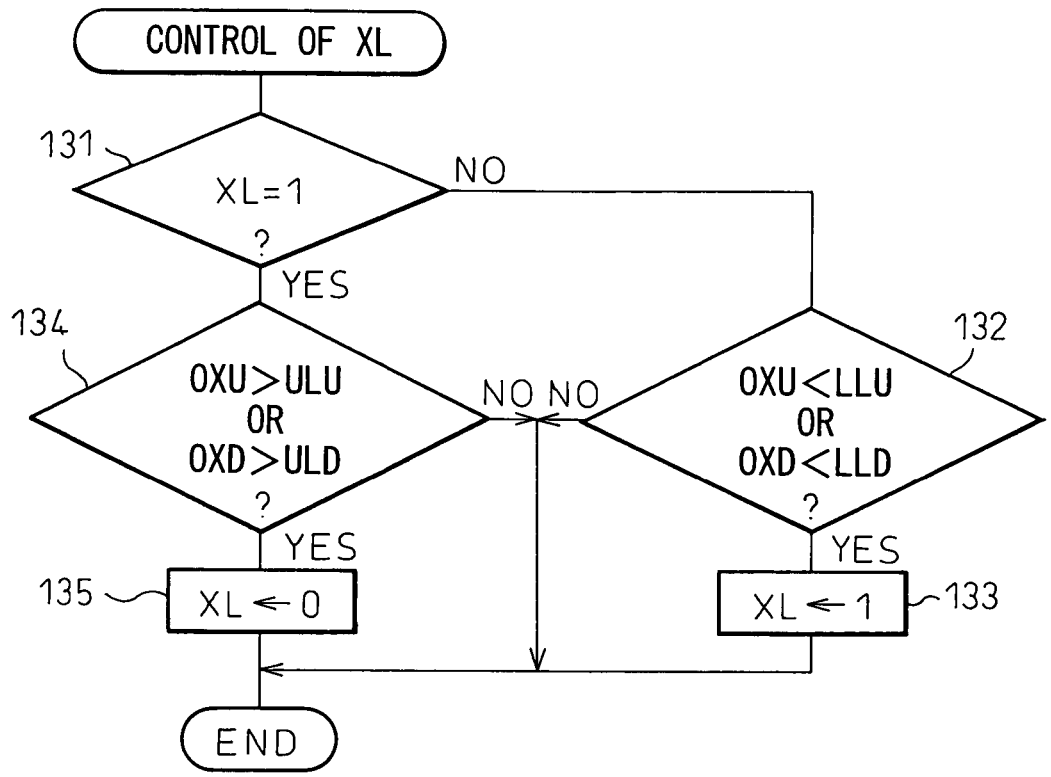
FIG. 13 is a flow chart of a routine for control of a lean flag XL of the first embodiment according to the present invention.

Referring to FIG. 10, at step 100, the routine for calculation of the representative upstream-side stored oxygen value OXU and representative downstream-side stored oxygen value OXD is executed. This routine is shown in FIG. 11 and FIG. 12. Next, at step 130, the routine for control of the lean flag XL is executed. This routine is shown in FIG. 13.

Referring to FIG. 11 and FIG. 12 showing the routine for calculation of the representative stored oxygen values OXU and OXD, first, at step 101, whether the fuel cut flag XFC is set is judged. When the fuel cut flag XFC is reset (XFC=0), next the routine proceeds to step 102 where whether the fuel increase correction flag XINC is set is judged. When the fuel increase correction flag XINC is reset (XINC=0), next the routine proceeds to step 103 where whether the lean flag XL is set is judged. When the lean flag XL is reset (XL=0), that is, when slight rich control is being performed, next the routine proceeds to step 104 where the changes $\Delta$OXU and $\Delta$OXD are calculated ($\Delta$OXU=−Ga·KRU, $\Delta$OXD=−Ga·KRD). Next, at step 105, whether the output voltage VD of the downstream-side air-fuel ratio sensor 41*d* is lower than the voltage VS corresponding to the stoichiometric air-fuel ratio is judged. When VD<VS, that is, when slight lean control is being performed, and the air-fuel ratio detected by the downstream-side air-fuel ratio sensor 41*d* is lean, the routine proceeds to step 106 where the representative downstream-side stored oxygen value OXD is calculated ($\Delta$OXD=Ga·KRC). Next, the routine proceeds to step 116. As opposed to this, when VD$\geq$VS, that is, when slight rich control is being performed, and the air-fuel ratio detected by the downstream-side air-fuel ratio sensor 41*d* is rich, the routine jumps from step 105 to step 116.

As opposed to this, when the lean flag XL is set (XL=1), that is, when slight lean control is being performed, the routine proceeds from step 103 to step 107 where the changes $\Delta$OXU and $\Delta$OXD are calculated ($\Delta$OXU=Ga·KLU, $\Delta$OXD=Ga·KLD). Next, at step 108, whether the output voltage VD of the downstream-side air-fuel ratio sensor 41*d* is higher than the voltage VS corresponding to the stoichiometric air-fuel ratio is judged. When VD>VS, that is, when slight lean control is being performed, and the air-fuel ratio detected by the downstream-side air-fuel ratio sensor 41*d* is rich, the routine proceeds to step 109 where the representative downstream-side stored oxygen value OXD is calculated ($\Delta$OXD=−Ga·KLC). Next, the routine proceeds to step 116. As opposed to this, when VD$\leq$VS, that is, when slight lean control is being performed, and the air-fuel ratio detected by the downstream-side air-fuel ratio sensor 41*d* is lean, the routine jumps from step 108 to step 116.

When the fuel increase correction flag XINC is set (XINC=1), the routine proceeds from step 102 to step 110 where the changes $\Delta$OXU and $\Delta$OXD are calculated ($\Delta$OXU=−(Ga·KINC)·INC, $\Delta$OXD=−(Ga·KINCD)·INC). Next, at step 111, whether the output voltage VD of the downstream-side air-fuel ratio sensor 41*d* is lower than the voltage VS corresponding to the stoichiometric air-fuel ratio is judged. When VD<VS, that is, when fuel increase correction is being performed, and the air-fuel ratio detected by the downstream-side air-fuel ratio sensor 41*d* is lean, the routine proceeds to step 112 where the change $\Delta$OXD of the representative downstream-side stored oxygen value OXD is made zero ($\Delta$OXD=0). Next, the routine proceeds to step 116. As opposed to this, when VD$\geq$VS, that is, when fuel increase correction is being performed, and the air-fuel ratio detected by the downstream-side air-fuel ratio sensor 41*d* is rich, the routine jumps from step 111 to step 116.

When the fuel cut flag XFC is set (XFC=1), that is, the fuel to the engine is cut, the routine proceeds from step 101 to step 113 where the changes $\Delta$OXU and $\Delta$OXD are calculated ($\Delta$OXU=Ga·KFCU, $\Delta$OXD=Ga·KFCD). Next, at step 114, whether the output voltage VD of the downstream-side air-fuel ratio sensor 41*d* is lower than the voltage VS corresponding to the stoichiometric air-fuel ratio is judged. When VD>VS, that is, when fuel to the engine is cut, and the air-fuel ratio detected by the downstream-side air-fuel ratio sensor 41*d* is rich, the routine proceeds to step 115 where the change $\Delta$OXD of the representative downstream-side stored oxygen value OXD is made zero ($\Delta$OXD=0). Next, the routine proceeds to step 116. As opposed to this, when VD$\leq$VS, that is, when fuel to the engine is cut, and the air-fuel ratio detected by the downstream-side air-fuel ratio sensor 41*d* is lean, the routine jumps from step 114 to step 116.

At step 116, the representative upstream-side stored oxygen value OXU and representative downstream-side stored oxygen value OXD are calculated (OXU=OXU+$\Delta$OXU, OXD=OXD+$\Delta$OXD). Next, at step 117, the guard processing is performed.

Referring to FIG. 13 showing the routine for control of the lean flag XL, at step 131, whether the lean flag XL has been set is judged. When the lean flag XL has been reset (XL=0), next the routine proceeds to step 132 where whether the representative upstream-side stored oxygen value OXU or representative downstream-side stored oxygen value OXD is smaller than the corresponding allowable lower limit LLU or LLD is judged. When OXU$\geq$LLU and OXD$\geq$LLD, the processing cycle ends, while when OXU<LLU or OXD<LLD, next the routine proceeds to step 133 where the lean flag XL is set (XL=1).

When the lean flag XL is set (XL=1), the routine proceeds from step 131 to step 134 where whether the representative upstream-side stored oxygen value OXU or the representative downstream-side stored oxygen value OXD is larger than the corresponding allowable upper limit ULU or ULD is judged. When OXU$\leq$ULU and OXD$\leq$ULD, the processing cycle ends, while when OXU>ULU or OXD>ULD, next the routine proceeds to step 135 where the lean flag XL is reset (XL=0).

Figure 14:
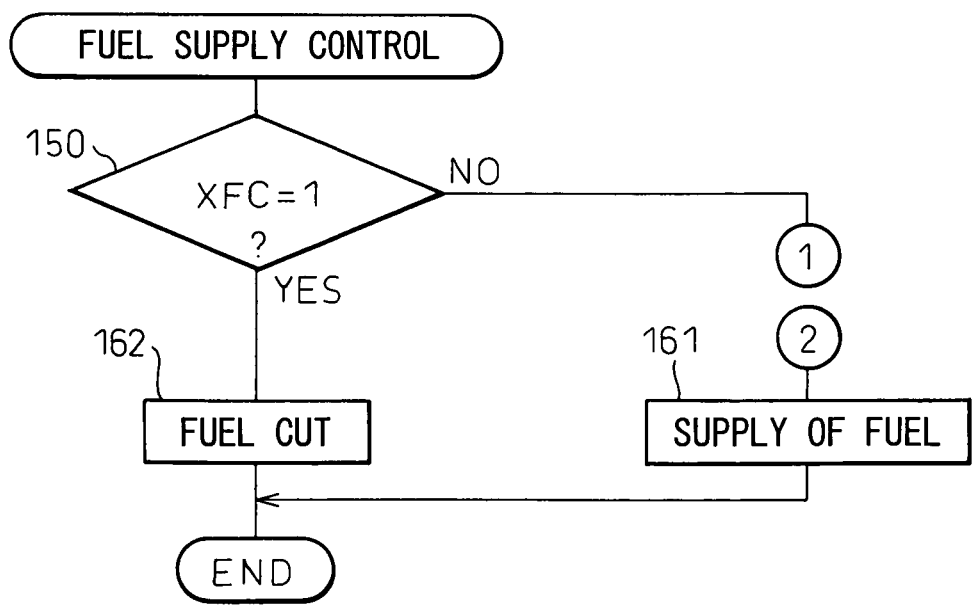
FIG. 14 is a flow chart of a routine for control of fuel supply of the first embodiment according to the present invention.
Figure 15:
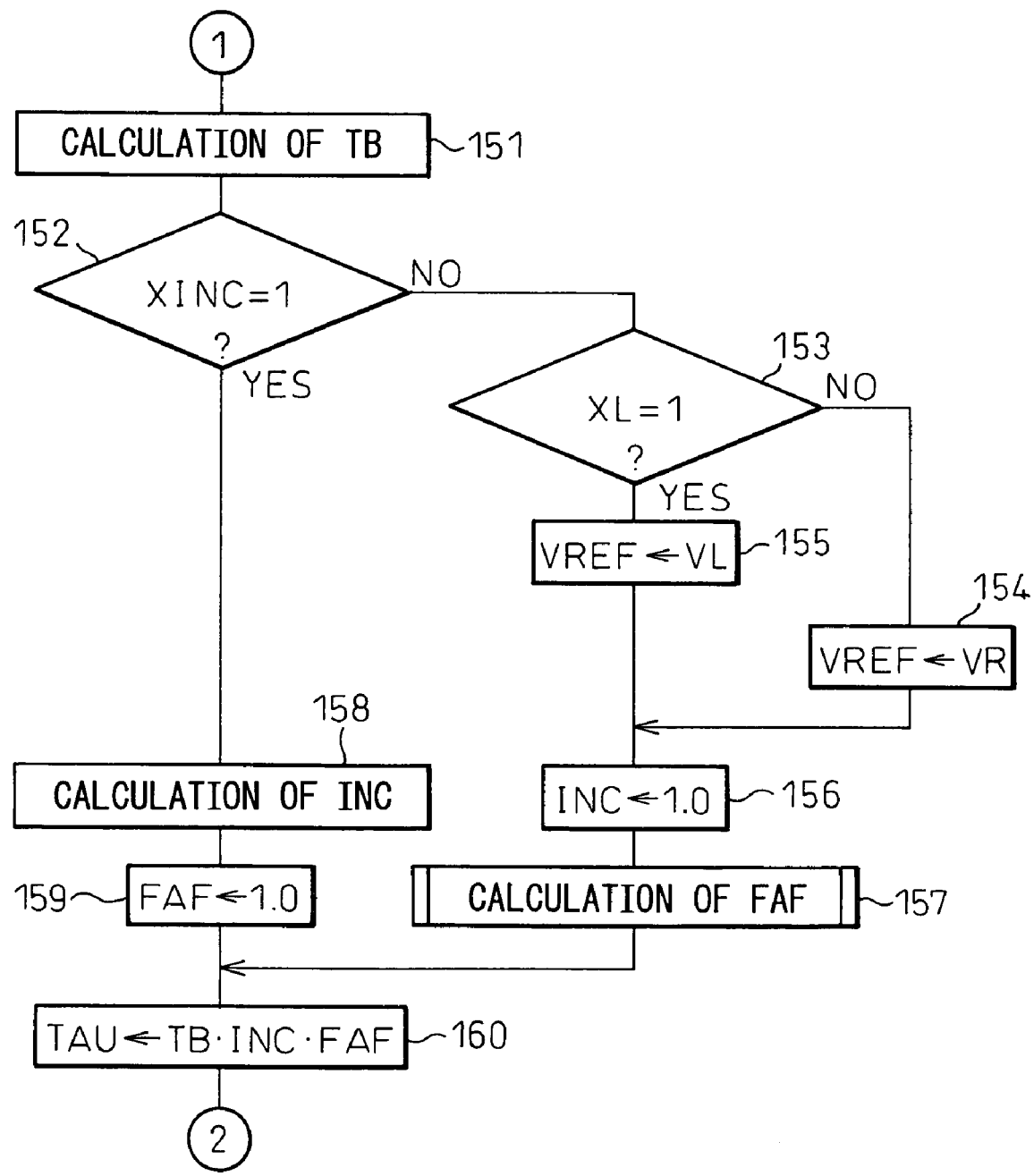
FIG. 15 is a flow chart of a routine for control of fuel supply of the first embodiment according to the present invention.

FIG. 14 and FIG. 15 show a routine for control of the fuel supply of the first embodiment according to the present invention. This routine is executed by interruption at a predetermined set crank angle for example.

Referring to FIG. 14 and FIG. 15, first, at step 150, whether the fuel cut flag XFC is set is judged. When the fuel cut flag XFC is reset (XFC=0), next the routine proceeds to step 151 where the basic fuel injection time TB is calculated from the map of FIG. 3. At the next step 152, whether the fuel increase correction flag XINC has been set is judged. When the fuel increase correction flag XINC has been reset (XINC=0), next the routine proceeds to step 153 where whether the lean flag XL has been set is judged. When the lean flag XL has been reset (XL=0), that is, when slight rich control should be performed, next the routine proceeds to step 154 where the reference voltage VREF is set to the above-mentioned VR. Next, the routine proceeds to step 156. As opposed to this, when the lean flag XL is set (XL=1), that is, when slight lean control should be performed, next the routine proceeds to step 155 where the reference voltage VREF is set to the above-mentioned VL. Next, the routine proceeds to step 156. At step 156, the fuel increase correction coefficient INC is fixed to 1.0, while at the next step 157, the routine for calculation of the feedback correction coefficient FAF shown in FIG. 4 is executed. Next, the routine jumps to step 160. As opposed to this, when the fuel increase correction flag XINC is set (XINC=1), the routine proceeds from step 152 to step 158 where the fuel increase correction coefficient INC is calculated. At the next step 159, the feedback correction coefficient FAF is fixed to 1.0. Next, the routine jumps to step 160.

At step 160, the fuel injection time TAU is calculated (TAU=TB·INC·FAF). Next, at step 161, fuel is injected from a fuel injector 15 by exactly TAU.

On the other hand, when the fuel cut flag XFC is set (XFC=1), the routine proceeds from step 150 to step 162 where the fuel to the engine is cut.

Figure 16:
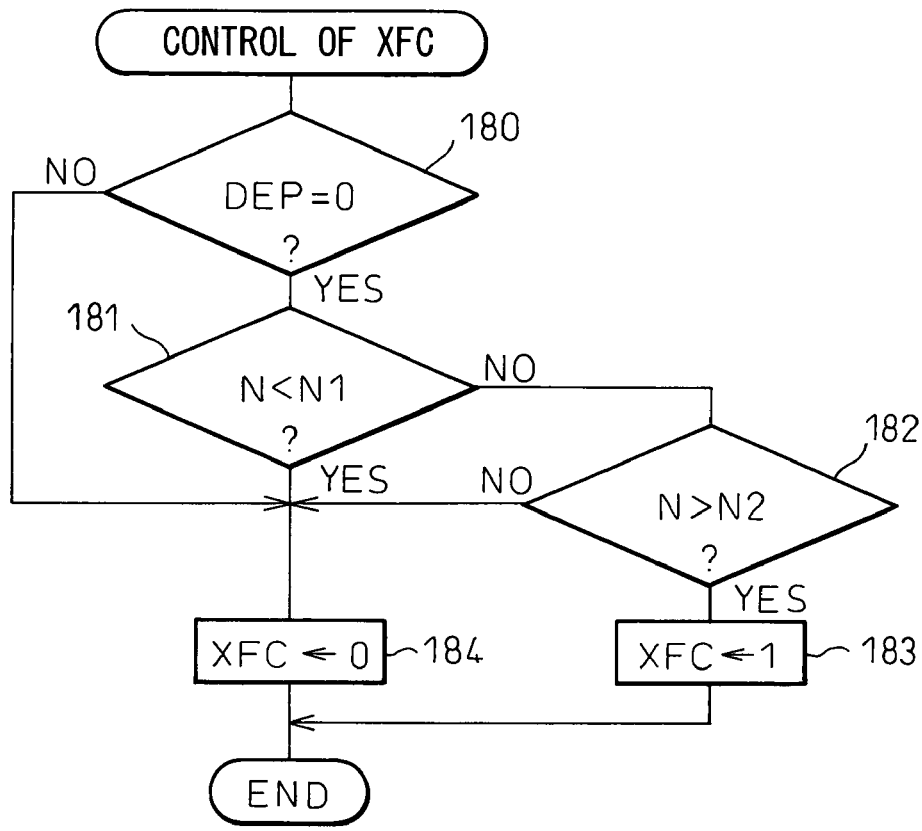
FIG. 16 is a flow chart of a routine for control of a fuel cut flag XFC of the first embodiment according to the present invention.

FIG. 16 shows a routine for control of the fuel cut flag XFC. This routine is executed by interruption every predetermined set time.

Referring to FIG. 16, first, at step 180, whether the amount of depression DEP of the accelerator pedal is zero is judged. When DEP=0, next the routine proceeds to step 181 where whether the engine speed N is lower than a first set speed N1 is judged. When N≧N1, next the routine proceeds to step 182 where whether the engine speed N is higher than a second set speed N2 (<N1) is judged. When N>N2, next the routine proceeds to step 183 where the fuel cut flag XFC is set (XFC=1).

On the other hand, when DEP>0 at step 180, when N<N1 at step 181, or N≦N2 at step 182, next the routine proceeds to step 184 where the fuel cut flag XFC is reset (XFC=0).

Figure 17:
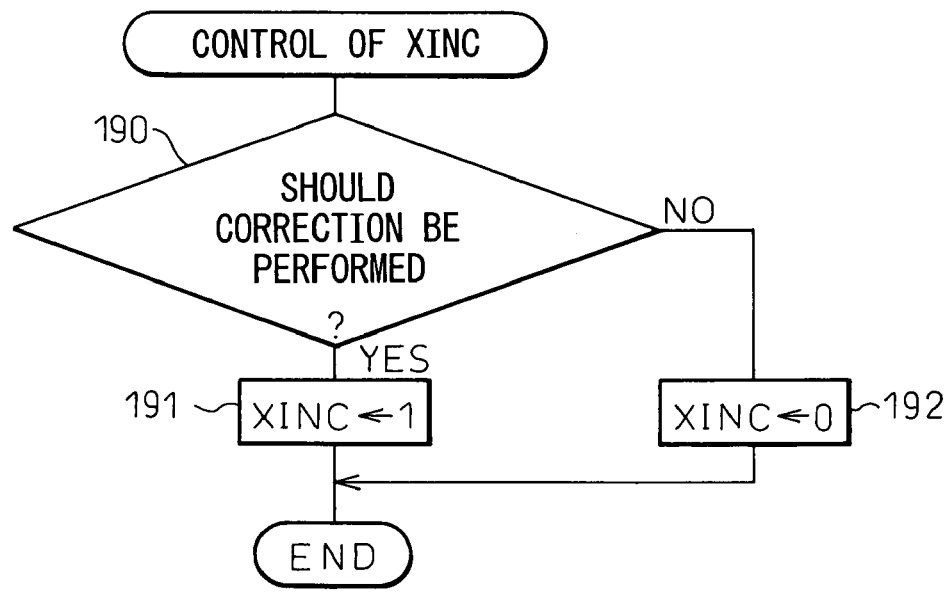
FIG. 17 is a flow chart of a routine for control of fuel increase correction flag XINC of the first embodiment according to the present invention.

FIG. 17 shows the routine for control of the fuel increase correction flag XINC. This routine is executed by interruption every predetermined set time.

Referring to FIG. 17, at step 190, whether the fuel increase correction should be performed is judged. When fuel increase correction should be performed, the routine proceeds to step 191 where the fuel increase correction flag XINC is set (XINC=1). As opposed to this, when fuel increase correction should not be performed, the routine proceeds to step 192 where the fuel increase correction flag XINC is reset (XINC=0).

Figure 18:
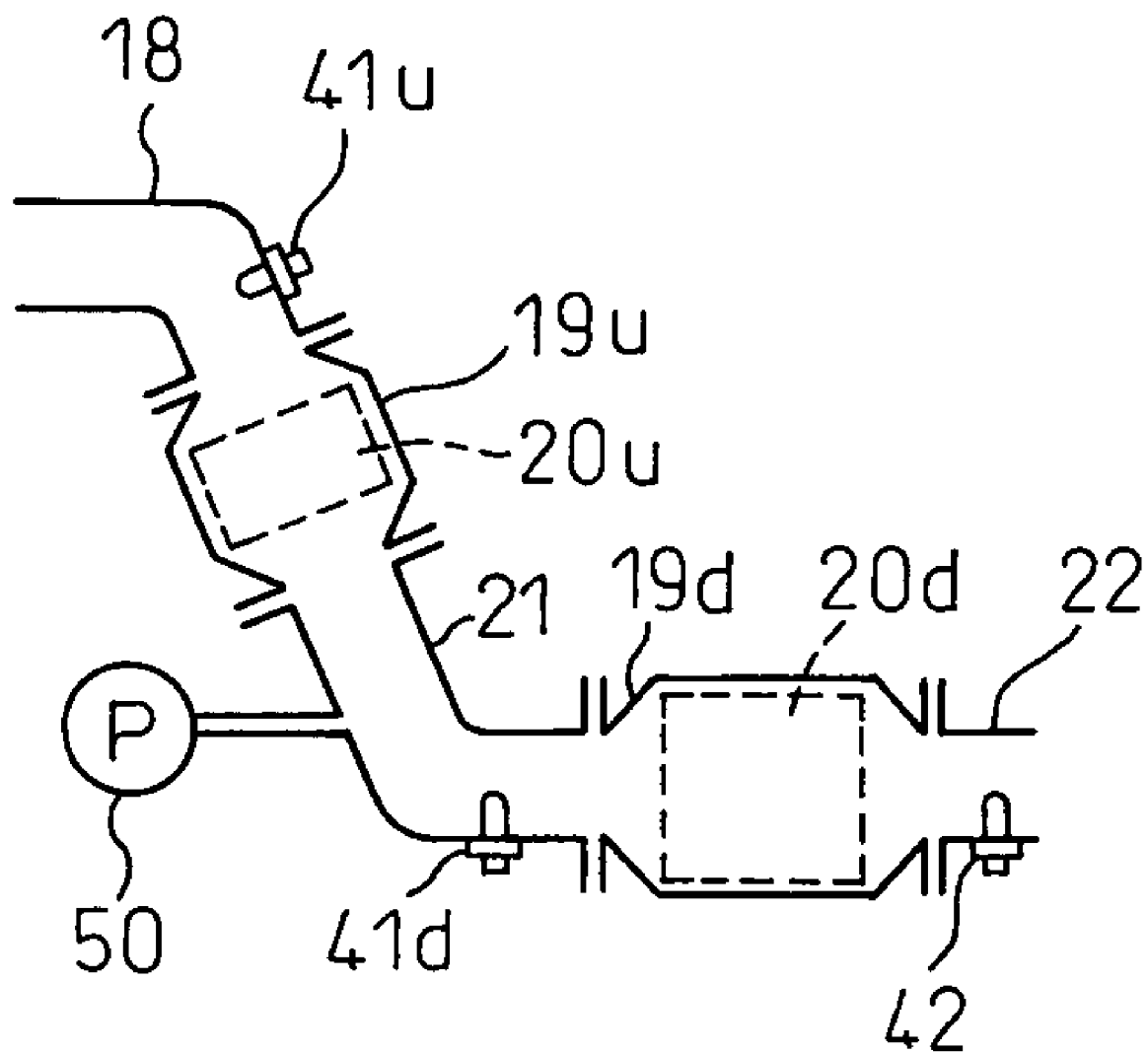
FIG. 18 is a partial view of an internal combustion engine of a second embodiment according to the present invention.

Next, a second embodiment according to the present invention will be explained. In this second embodiment, as shown in FIG. 18, an air pump 50 for supplying secondary air is connected to the exhaust pipe 21 between the upstream-side catalyst 20u and the downstream-side catalyst 20d. This air pump 50 is controlled based on an output signal from the electronic control unit 30. If the air pump 50 is operated to supply secondary air, it is possible to increase the amount of stored oxygen in the downstream-side catalyst 20d.

In the first embodiment according to the present invention explained above, whether to perform the slight rich control or the slight lean control was determined based on the representative upstream-side stored oxygen value OXU and the representative downstream-side stored oxygen value OXD.

As opposed to this, in the second embodiment according to the present invention, whether to perform the slight rich control or perform the slight lean control is determined based on only the representative upstream-side stored oxygen value OXU, while whether to supply secondary air by the air pump 50 is determined based on the representative downstream-side stored oxygen value OXD.

Figure 19:
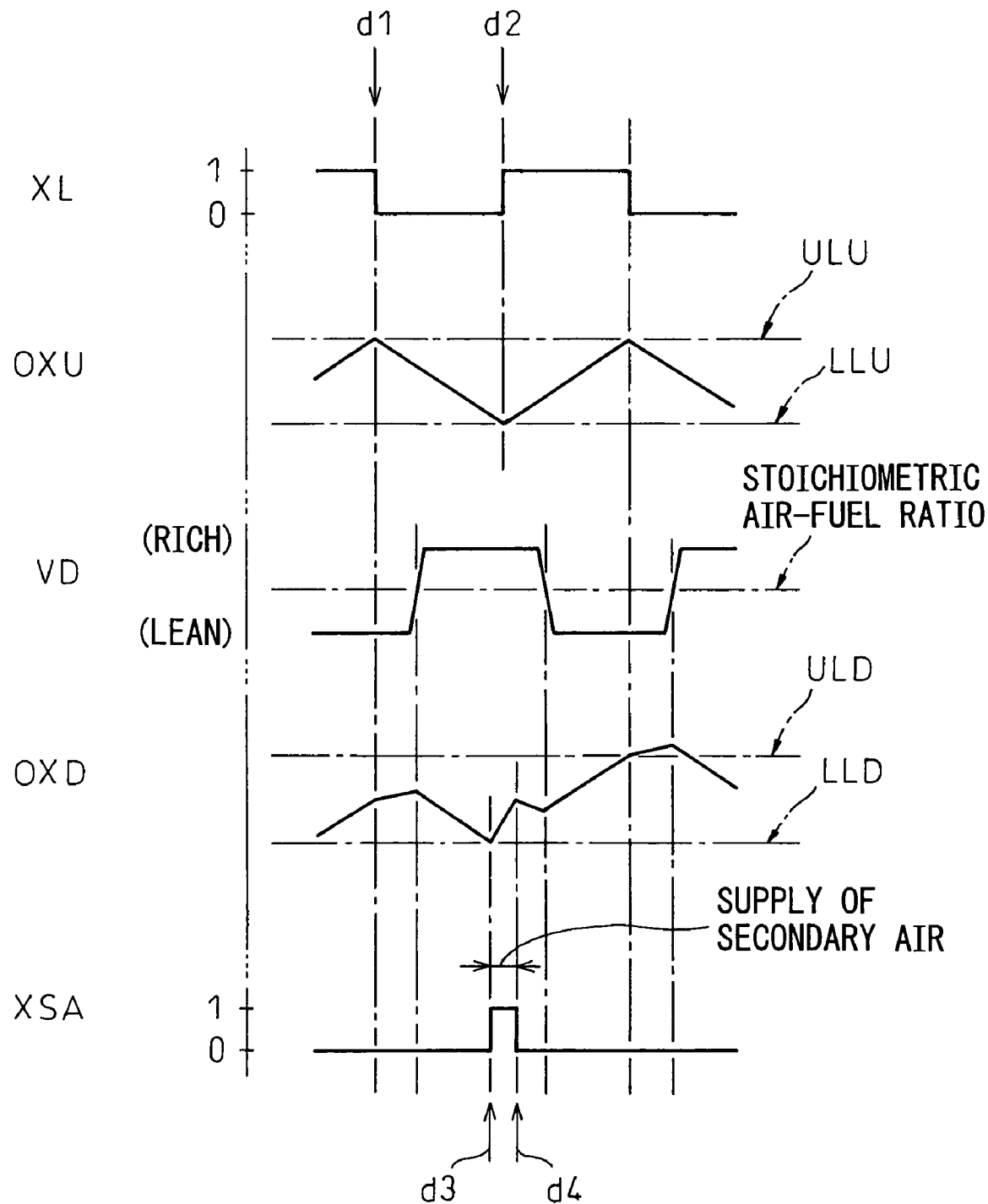
FIG. 19 is a time chart for explaining the second embodiment according to the present invention.

Next, the second embodiment according to the present invention will be explained further with reference to FIG. 19. In FIG. 19, XSA shows a secondary air supply flag. This secondary air supply flag XSA is set when secondary air should be supplied by the air pump (XSA=1) and is reset otherwise (XSA=0).

For example when the lean flag XL is set (XL=1) and therefore slight lean control is being performed, if the representative upstream-side stored oxygen value OXU becomes larger than its allowable upper limit ULU (see d1 of FIG. 19), the lean flag XL is reset (XL=0) and therefore slight rich control is switched to. If slight rich control is performed, the representative upstream-side stored oxygen value OXU is gradually decreased. Next, when the representative upstream-side stored oxygen value OXU becomes smaller than its allowable lower limit LLU (see d2 of FIG. 19), the lean flag XL is set (XL=1) and therefore slight lean control is switched to.

On the other hand, when slight rich control is to be performed, the representative downstream-side stored oxygen value OXD is gradually decreased. Next, when the representative downstream-side stored oxygen value OXD becomes smaller than the allowable lower limit LLD (see d3 of FIG. 19), the secondary air supply flag XSA is set (XSA=1). As a result, the secondary air starts to be supplied by the air pump 50.

When secondary air is being supplied, the representative downstream-side stored oxygen value OXD calculated based on the control state of the engine and the output of the downstream-side air-fuel ratio sensor 41d in the same way as the first embodiment is increased by the increase KSA (>0) (OXD=OXD+KSA). This increase KSA is for example determined based on the amount of discharged air per unit time of the air pump 50. In this case, it is possible to deem that the representative downstream-side stored oxygen value OXD calculated based on the engine control state and the output of the downstream-side air-fuel ratio sensor 41d is corrected in accordance with the state of the supply of the secondary air.

Next, when the secondary air has been supplied for example for exactly the supply time tSA (see d4 of FIG. 19), the secondary air supply flag XSA is reset (XSA=0) and therefore the secondary air is cut. Note that the supply time tSA is the time required for increasing the representative downstream-side stored oxygen value OXD to the target value, for example, the mean value of the allowable upper limit ULD and the allowable lower limit LLD (=(ULD+LLD)/2) and can be set based on the representative downstream-side stored oxygen value OXD when starting the supply of the secondary air and the amount of discharged air per unit time of the air pump 50.

Accurately controlling the amount of secondary air supplied from the air pump 50 is difficult. Due to the supply of secondary air, the representative downstream-side stored oxygen value OXD may sometimes exceed its allowable upper limit ULD. Even in this case, to decrease the NOx flowing out from the downstream-side catalyst 20d, in the second embodiment according to the present invention, the supply of secondary air is allowed at the time of engine low load operation and the supply of secondary air is prohibited at the time of engine high load operation.

Figure 20:
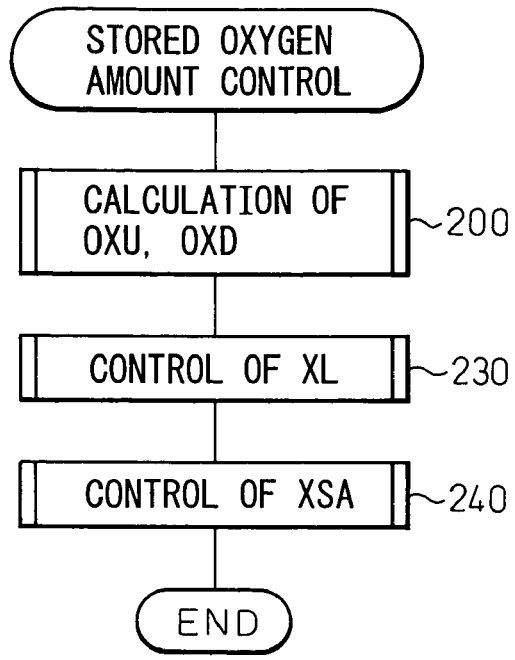
FIG. 20 is a flow chart of a routine for control of the amount of stored oxygen of the second embodiment according to the present invention.

FIG. 20 shows the routine for control of the amount of stored oxygen of a second embodiment according to the present invention. This routine is executed by interruption every predetermined set time.

Figure 21:
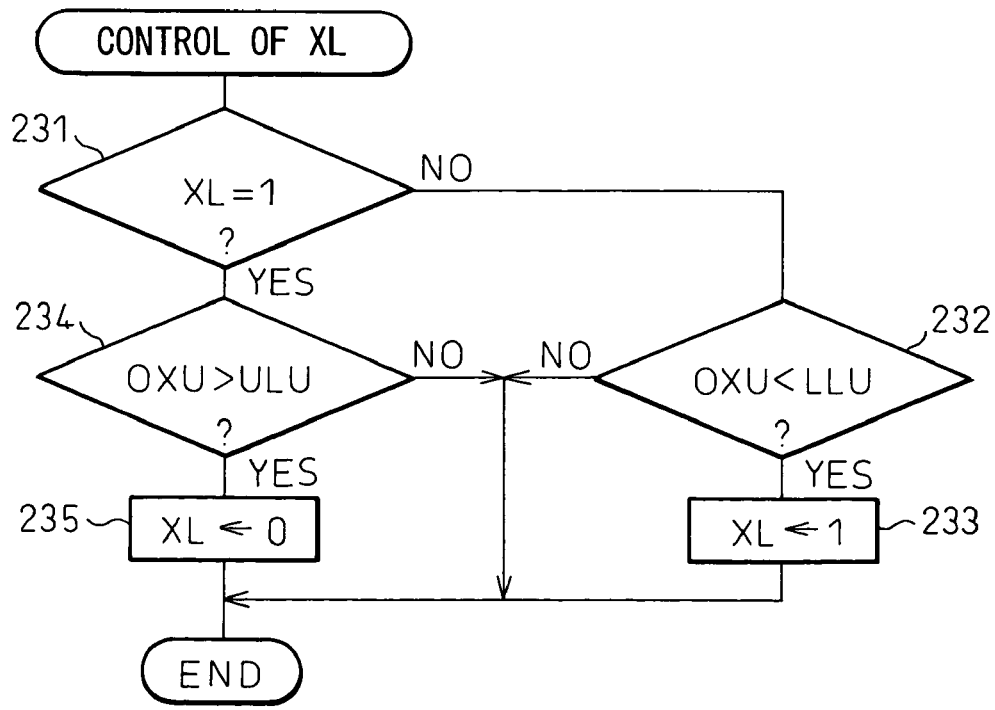
FIG. 21 is a flow chart of a routine for control of a lean flag XL of the second embodiment according to the present invention.

Referring to FIG. 20, at step 200, the routine for calculation of the representative upstream-side stored oxygen value OXU and the representative downstream-side stored oxygen value OXD shown in FIG. 11 and FIG. 12 is executed. At the next step 230, the routine for control of the lean flag XL of the second embodiment according to the present invention is executed. This routine is shown in FIG. 21. At the next step 240, a routine for control of the secondary air supply flag XSA is executed. This routine is shown in FIG. 22.

Referring to FIG. 21 showing the routine for control of the lean flag XL of the second embodiment according to the present invention, at step 231, whether the lean flag XL has been set is judged. When the lean flag XL is reset (XL=0), next the routine proceeds to step 232 where whether the representative upstream-side stored oxygen value OXU is smaller than the corresponding allowable lower limit LLU is judged. When OXU≧LLU, the processing cycle is ended, while when OXU<LLU, next the routine proceeds to step 233 where the lean flag XL is set (XL=1).

When the lean flag XL is set (XL=1), the routine proceeds from step 231 to step 234 where whether the representative upstream-side stored oxygen value OXU is larger than the corresponding allowable upper limit ULU is judged. When OXU≦ULU, the processing cycle is ended, while when OXU>ULU, next the routine proceeds to step 235 where the lean flag XL is reset (XL=0).

Figure 22:
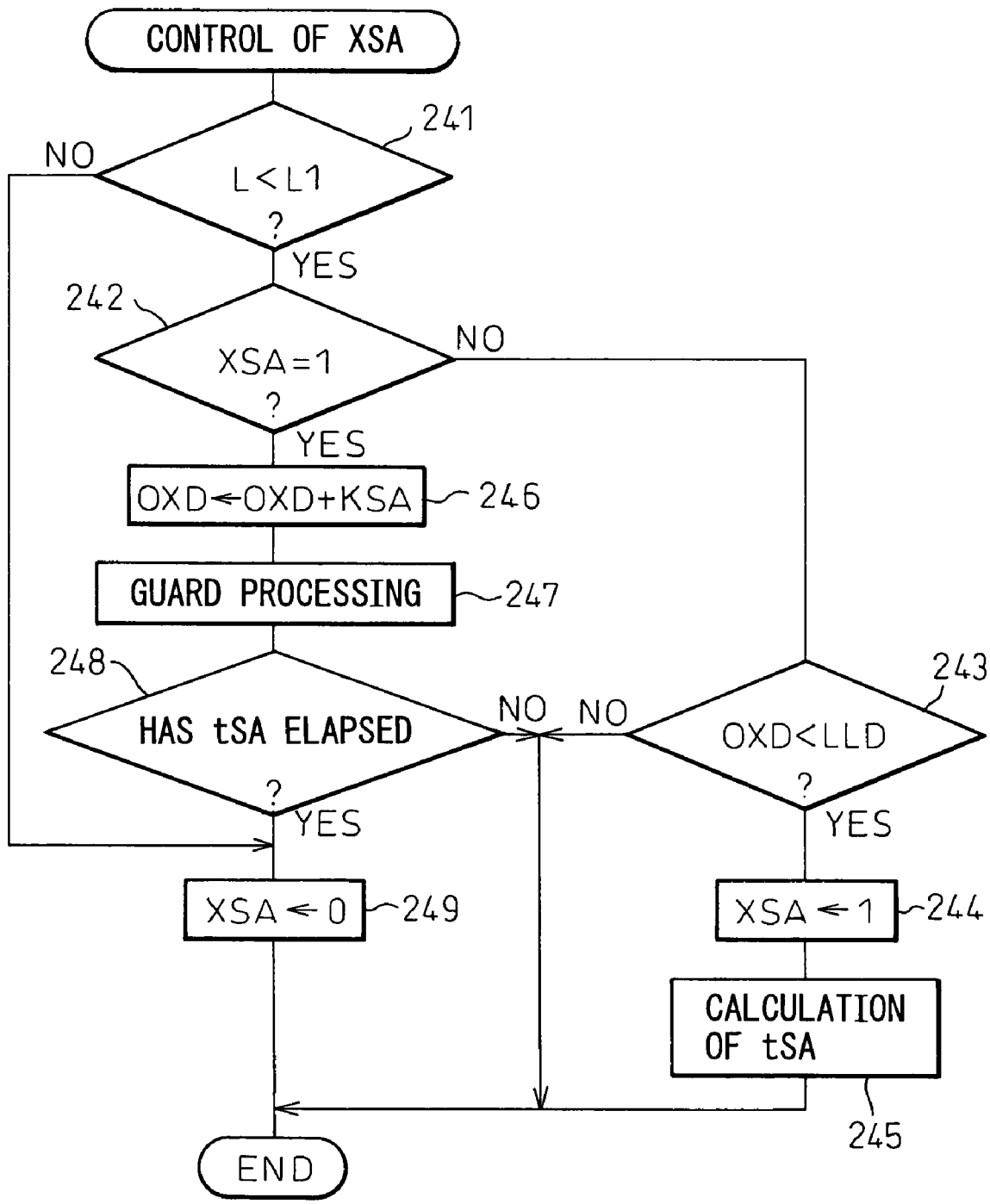
FIG. 22 is a flow chart of a routine for control of a secondary air supply flag XSA of the second embodiment according to the present invention.

Referring to FIG. 22 showing the routine for control of the secondary air supply flag XSA, at step 241, whether the engine load L (=intake air amount Ga/engine speed N) is lower than a predetermined set load L1 is judged. When L<L1, that is, at the time of engine low load operation, next the routine proceeds to step 242 where whether the secondary air supply flag XSA is set is judged. When the secondary air supply flag XSA is reset (XSA=0), next the routine proceeds to step 243 where whether the representative downstream-side stored oxygen value OXD is smaller than the corresponding allowable lower limit LLD is judged. When OXD≧LLD, the processing cycle is ended, while when OXD<LLD, next the routine proceeds to step 244 where the secondary air supply flag XSA is set (XSA=1). At the next step 245, the supply time tSA is set.

As opposed to this, when the secondary air supply flag XSA is set (XSA=1), that is, when secondary air is being supplied, the routine proceeds from step 242 to step 246 where the representative downstream-side stored oxygen value OXD is calculated (OXD=OXD+KSA). At the next step 247, the guard processing is performed. At the next step 248, whether a supply time tSA has elapsed from when the secondary air started being supplied has elapsed is judged. When the supply time tSA has not elapsed from when the secondary air started being supplied, the processing cycle is ended, while when the supply time tSA has elapsed from when the secondary air started being supplied, the routine proceeds to step 249 where the secondary air supply flag XSA is reset (XSA=0).

On the other hand, when L≧L1, that is, at the time of engine high load operation, the routine proceeds from step 241 to step 249 where the secondary air supply flag XSA is reset (XSA=0).

FIG. 23 shows a routine for control of supply of secondary air of the second embodiment according to the present invention. This routine is executed by interruption every predetermined set time.

Referring to FIG. 23, first, at step 290, whether the secondary air supply flag XSA has been set is judged. When the secondary air supply flag XSA has been set (XSA=1), next the routine proceeds to step 291 where the air pump 50 is operated. As opposed to this, when the secondary air supply flag XSA is reset (XSA=0), next the routine proceeds to step 292 where the operation of the air pump 50 is stopped.

The rest of the configuration and action of the second embodiment according to the present invention are similar to those of the first embodiment according to the present invention, so their explanations will be omitted.

Next, a third embodiment according to the present invention will be explained.

First, referring to FIG. 24, air-fuel ratio fluctuation control for forcibly causing fluctuation about the stoichiometric air-fuel ratio will be explained. The air-fuel ratio fluctuation control alternatively increases and decreases the air-fuel ratio across the stoichiometric air-fuel ratio.

FIG. 24A shows the behavior of the air-fuel ratio at the time of slight lean control without air-fuel ratio fluctuation control. This matches with the behavior of the air-fuel ratio shown in FIG. 6B.

As opposed to this, if performing slight lean control while performing air-fuel ratio fluctuation control, the air-fuel ratio fluctuates as shown in FIG. 24B. That is, compared with the usual case shown in FIG. 24A, the amplitude of the air-fuel ratio becomes greater and the period becomes shorter. However, at this time, the average air-fuel ratio is maintained just slightly lean. The same applies to the case of slight rich control while performing air-fuel ratio fluctuation control.

The amplitude and period of the air-fuel ratio are determined in accordance with the skip values SR and SL and the integration values IR and IL explained with reference to FIG. 5. Therefore, in the third embodiment according to the present invention, the skip values SR and SL and the integration values IR and IL for the usual time when air-fuel ratio fluctuation control is not performed are set to SR0, SL0, IR0, and IL0, while the skip values SR and SL and the integration values IR and IL for when air-fuel ratio fluctuation control is performed are set to SR0·a, SL0·a, IR0·a, and IL0·a (a>1.0).

When the above air-fuel ratio fluctuation control is performed, the air-fuel ratio of the exhaust gas flowing out from the upstream-side catalyst 20u and flowing into the downstream-side catalyst 20d, that is, the air-fuel ratio detected by the downstream-side air-fuel ratio sensor 41d, becomes larger in amplitude and shorter in period. As a result, when performing slight lean control while controlling the air-fuel ratio, the amount of stored oxygen in the downstream-side catalyst 20d increases. As opposed to this, when performing slight rich control while controlling the air-fuel ratio, the amount of stored oxygen in the downstream-side catalyst 20d does not decrease much at all.

Note that in performing air-fuel ratio fluctuation control, it is confirmed that the NOx purification rate of the three-way catalysts is enhanced when the air-fuel ratio particularly deviates from the stoichiometric air-fuel ratio relatively greatly.

Now, in the third embodiment according to the present invention, in the same way as the second embodiment, whether to perform slight rich control or slight lean control is determined based on only the representative upstream-side stored oxygen value OXU. On the other hand, whether to perform the air-fuel ratio fluctuation control is determined based on the representative downstream-side stored oxygen value OXD. Specifically, when the representative downstream-side stored oxygen value OXD becomes smaller than its allowable lower limit LLD, air-fuel ratio fluctuation control is performed to increase the representative downstream-side stored oxygen value OXD. Next, when the representative downstream-side stored oxygen value OXD becomes larger than its allowable upper limit ULD, the air-fuel ratio fluctuation control is stopped.

When performing slight lean control while performing air-fuel ratio fluctuation control, in the same way as the first embodiment, the representative downstream-side stored oxygen value OXD calculated based on the control state of the engine and the output of the downstream-side air-fuel ratio sensor 41d is further increased by the increase KFLC (>0) (OXD=OXD+KFLC). As opposed to this, when performing slight rich control while performing air-fuel ratio fluctuation control, the representative downstream-side stored oxygen value OXD calculated based on the control state of the engine and the output of the downstream-side air-fuel ratio sensor 41d is kept as it is. Therefore, it is possible to deem that the representative downstream-side stored oxygen value OXD calculated based on the control state of the engine and the output of the downstream-side air-fuel ratio sensor 41d is corrected according to the average air-fuel ratio when performing air-fuel ratio fluctuation control.

On the other hand, in the third embodiment according to the present invention, deterioration degree detection is performed for detecting the degree of deterioration of the upstream-side catalyst 20u based on the output of the downstream-side air-fuel ratio sensor 41d while forcibly making the air-fuel ratio fluctuate about the stoichiometric air-fuel ratio.

However, even when performing air-fuel ratio fluctuation control, since the air-fuel ratio is forcibly made to fluctuate, if performing the air-fuel ratio fluctuation control and the deterioration degree detection simultaneously, it would be no longer possible to accurately judge the degree of deterioration of the upstream-side catalyst 20u.

Therefore, in the third embodiment according to the present invention, when air-fuel ratio fluctuation control is being performed, detection of the degree of deterioration of the upstream-side catalyst 20u is prohibited.

FIG. 25 shows a routine for control of the amount of stored oxygen of the third embodiment according to the present invention. This routine is executed by interruption every predetermined set time.

Figure 26:
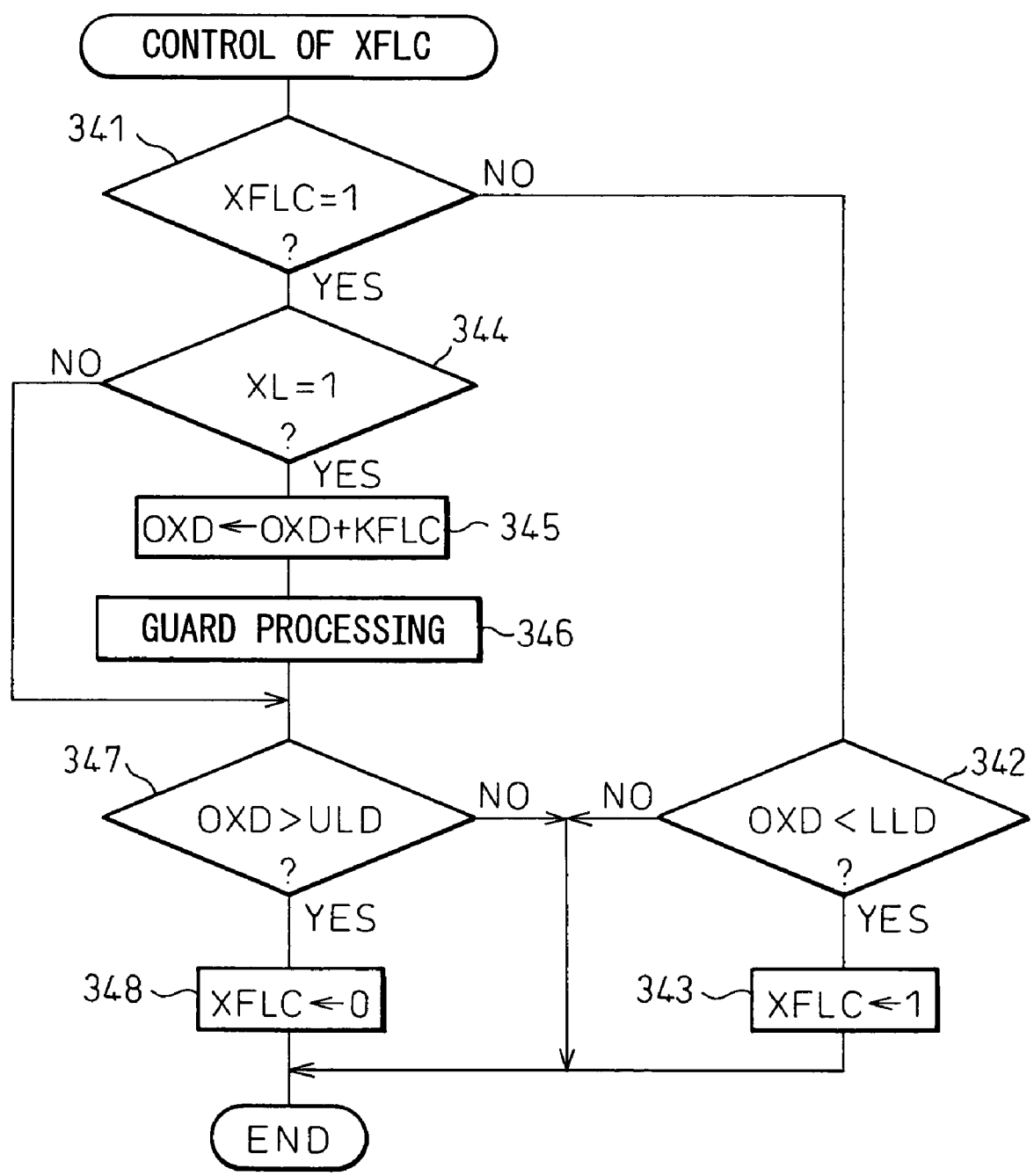
FIG. 26 is a flow chart of a routine for control of an air-fuel ratio fluctuation flag XFLC of the third embodiment according to the present invention.

Referring to FIG. 25, at step 300, the routine for calculation of the representative upstream-side stored oxygen value OXU and representative downstream-side stored oxygen value OXD shown in FIG. 11 and FIG. 12 is executed. At the next step 330, the routine for control of the lean flag XL shown in FIG. 21 is executed. At the next step 340, the routine for control of the air-fuel ratio fluctuation flag XFLC is executed. This routine is shown in FIG. 26. Note that the air-fuel ratio fluctuation flag XFLC is set (XFLC=1) when air-fuel ratio fluctuation control should be performed and is reset (XFLC=0) otherwise.

Referring to FIG. 26 showing the routine for control of the air-fuel ratio fluctuation flag XFLC, at step 341, whether the air-fuel ratio fluctuation flag XFLC has been set is judged. When the air-fuel ratio fluctuation flag XFLC has been reset (XFLC=0), next the routine proceeds to step 342 where whether the representative downstream-side stored oxygen value OXD is smaller than the corresponding allowable lower limit LLD is judged. When OXD≧LLD, the processing cycle is ended, while when OXD<LLD, next the routine proceeds to step 343 where the air-fuel ratio fluctuation flag XFLC is set (XFLC=1).

As opposed to this, when the air-fuel ratio fluctuation flag XFLC has been set (XFLC=1), that is, when air-fuel ratio fluctuation control is being performed, next the routine proceeds to step 344 where whether the lean flag XL has been set is judged. When the lean flag XL has been set (XL=1), that is, when slight lean control is being performed, next the routine proceeds to step 345 where the representative downstream-side stored oxygen value OXD is calculated (OXD=OXD+KFLC). At the next step 346, guard processing is performed. Next, the routine proceeds to step 347. As opposed to this, when the lean flag XL has been reset (XL=0), that is, when slight rich control is being performed, the routine jumps from step 344 to step 347.

At step 347, whether the representative downstream-side stored oxygen value OXD is larger than its corresponding allowable upper limit ULD is judged. When OXD≦ULD, the processing cycle is ended, while when OXD>ULD, next the routine proceeds to step 348 where the air-fuel ratio fluctuation flag XFLC is reset (XFLC=0).

Figure 27:
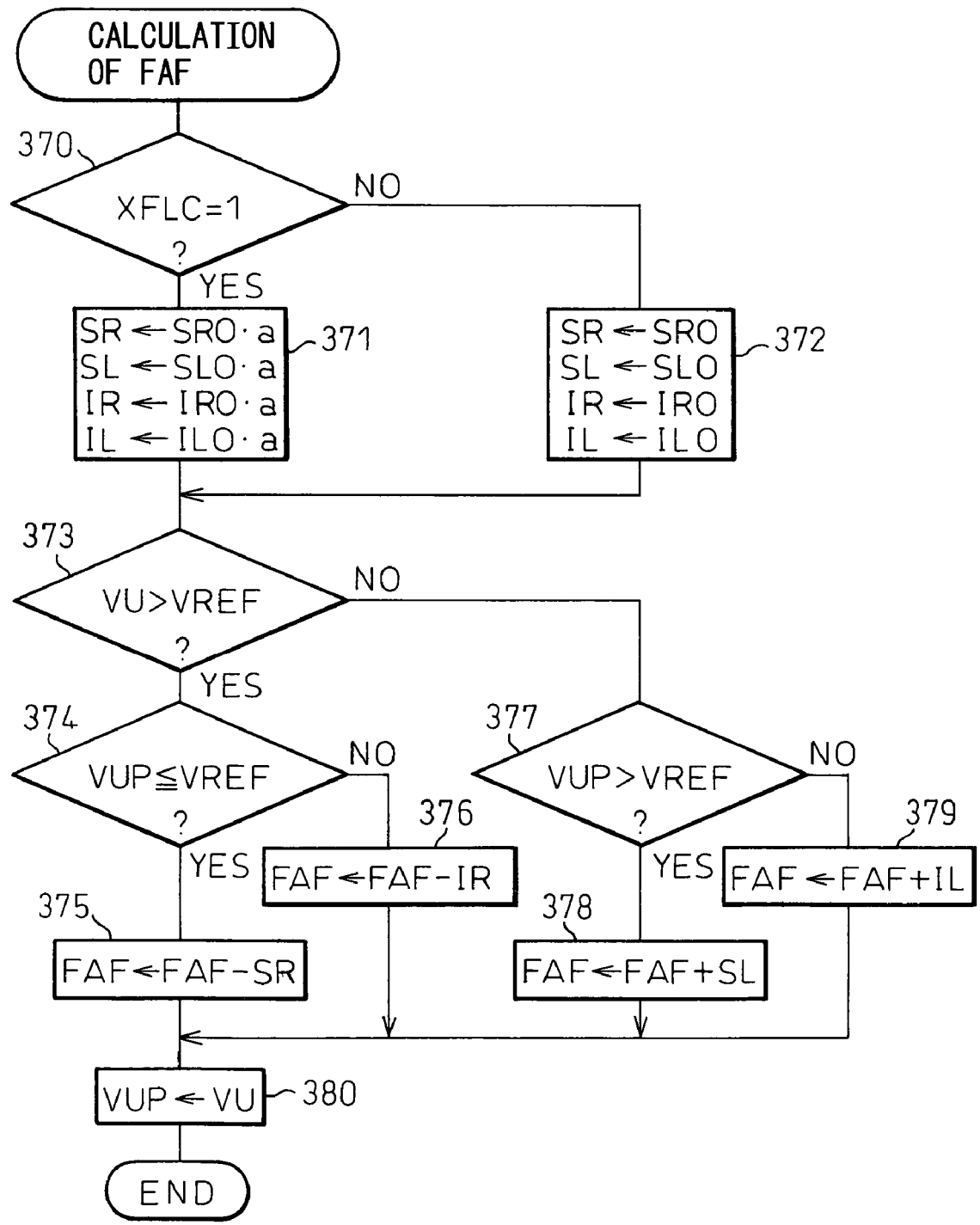
FIG. 27 is a flow chart of a routine for calculation of a feedback correction coefficient FAF of the third embodiment according to the present invention.

FIG. 27 shows a routine for calculation of the feedback correction coefficient FAF of the third embodiment according to the present invention. This routine is executed at step 157 of the routine for control of fuel supply shown in FIG. 14 and FIG. 15.

Referring to FIG. 27, at step 370, whether the air-fuel ratio fluctuation flag XFLC has been set is judged. When the air-fuel ratio fluctuation flag XFLC has been set (XFLC=1), next the routine proceeds to step 371 where the skip values SR and SL and the integration values IR and IL are set to the relatively large SR0·a, SL0·a, IR0·a, and IL0·a. Next, the routine proceeds to step 373. As opposed to this, when the air-fuel ratio fluctuation flag XFLC has been reset (XFLC=0), next the routine proceeds to step 372 where the skip values SR and SL and the integration values IR and IL are set to the relatively small SR0, SL0, IR0, and IL0. Next, the routine proceeds to step 373.

At step 373, whether the output voltage VU of the upstream-side air-fuel ratio sensor 41u is higher than a reference voltage VREF, that is, whether the air-fuel ratio is richer compared with the reference air-fuel ratio expressed by the reference voltage VREF, is judged. When VU>VREF, next the routine proceeds to step 374 where whether the output voltage VU of the upstream-side air-fuel ratio sensor 41u at the previous processing cycle was the reference voltage VREF or less, that is, whether the air-fuel ratio at the previous processing cycle was leaner than the reference air-fuel ratio, is judged. When VUP≦VREF, that is, when the air-fuel ratio has been switched from lean to rich with respect to the reference air-fuel ratio, next the routine proceeds to step 375 where the feedback correction coefficient FAF is decreased by exactly a skip value SR. Next, the routine proceeds to step 380. As opposed to this, when VUP>VREF, that is, when the air-fuel ratio continues to be richer than the reference air-fuel ratio, next the routine proceeds to step 376 where the feedback correction coefficient FAF is decreased by exactly an integration value IR (<<SR). Next, the routine proceeds to step 380.

On the other hand, when VU≦VREF at step 373, that is, when the air-fuel ratio is leaner than the reference air-fuel ratio, next the routine proceeds to step 377 where whether the output voltage VU of the upstream-side air-fuel ratio sensor 41u at the previous processing cycle was higher than the reference voltage VREF, that is, whether the air-fuel ratio at the previous processing cycle was leaner than the reference air-fuel ratio, is judged. When VUP>VREF, that is, when the air-fuel ratio switches from rich to lean with respect to the reference air-fuel ratio, next the routine proceeds to step 378 where the feedback correction coefficient FAF is increased by exactly the skip valve SL. As opposed to this, when VUP≦VREF, that is, when the air-fuel ratio continues to be leaner than the reference air-fuel ratio, next the routine proceeds to step 379 where the feedback correction coefficient FAF is increased by exactly the integration value IL (<<SL). Next, the routine proceeds to step 380.

At step 380, the output voltage VU of the upstream-side air-fuel ratio sensor 41u at the current processing cycle is stored as VUP.

Figure 28:
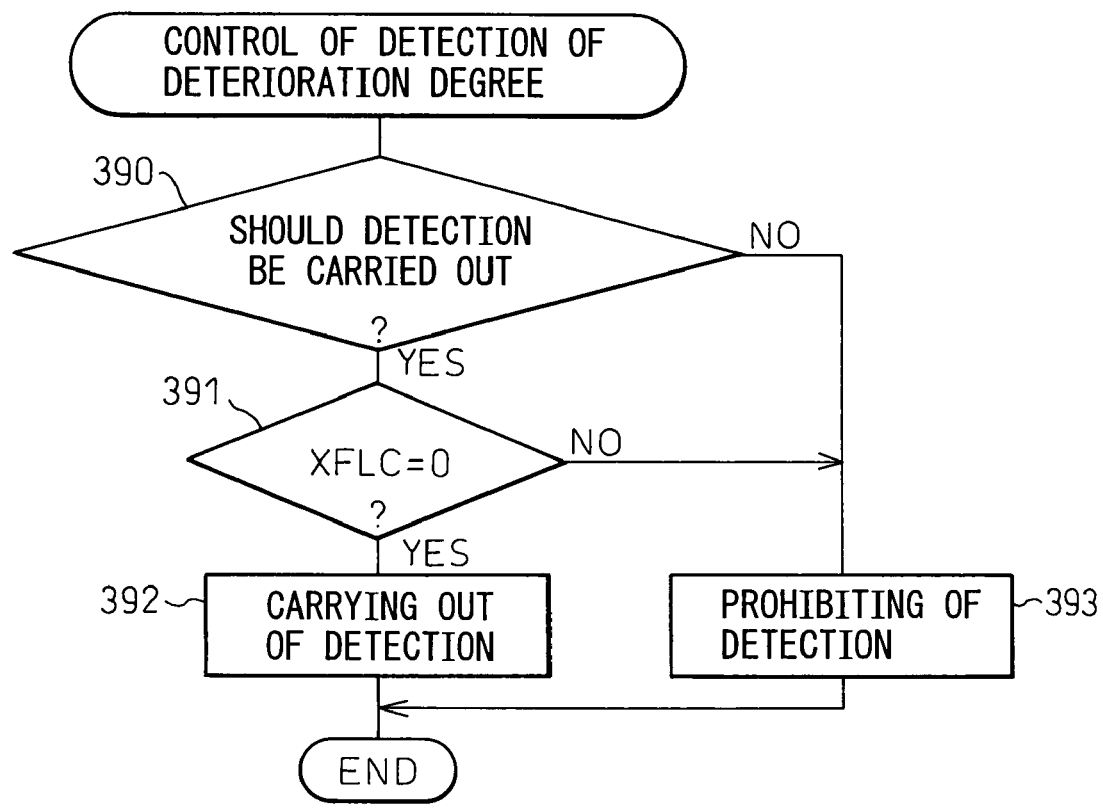
FIG. 28 is a flow chart of a routine for control for detection of a deterioration degree of the third embodiment according to the present invention.

FIG. 28 shows a routine for control of detection of the degree of deterioration. This routine is executed by interruption every predetermined set time.

Referring to FIG. 28, at step 390, whether the degree of deterioration of the upstream-side catalyst 20u should be detected is judged. For example, when exactly a certain operating time elapses from the previous detection of the degree of deterioration, it is judged that the degree of deterioration should be detected. When the degree of deterioration of the upstream-side catalyst 20u should be detected, next the routine proceeds to step 391 where whether the air-fuel ratio fluctuation flag XFLC has been reset is judged. When the air-fuel ratio fluctuation flag XFLC has been reset (XFLC=0), next the routine proceeds to step 392 where the degree of deterioration of the upstream-side catalyst 20$u$ is detected. As opposed to this, when the air-fuel ratio fluctuation flag XFLC has been set (XFLC=1), next the routine proceeds to step 393 where the detection of the degree of deterioration of the upstream-side catalyst 20$u$ is prohibited. On the other hand, when the degree of deterioration of the upstream-side catalyst 20$u$ should not be detected, the routine proceeds from step 390 to step 393 where the detection of the degree of deterioration of the upstream-side catalyst 20$u$ is prohibited.

The rest of the configuration and action of the third embodiment according to the present invention are similar to those of the second embodiment according to the present invention, so their explanations will be omitted.

Next, a fourth embodiment according to the present invention will be explained.

In the fourth embodiment according to the present invention, for example, at the time of engine low load operation where the engine load is lower than a predetermined set load L2, partial-cylinder engine operation is performed where part of the cylinders among the plurality of cylinders of the internal combustion engine, for example, the 1st cylinder #1 and the 4th cylinder #4, are operated and the remaining cylinders, for example, the 2nd cylinder #2 and the 3rd cylinder #3, are stopped from operating. As opposed to this, at the time of engine high load operation when the engine load is higher than the set load L2, all-cylinder engine operation is performed where all of the cylinders are operated.

Figure 29:
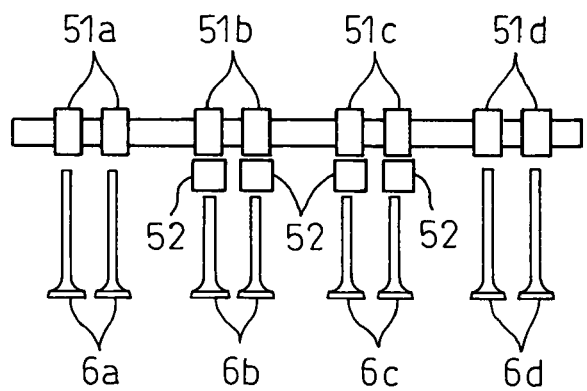
FIG. 29 is a partial view of an internal combustion engine of a fourth embodiment according to the present invention.

On the other hand, as shown in FIG. 29, valve opening operation control devices 52 for controlling the valve opening operations of the intake valves 6$b$ and 6$c$ are inserted between the intake valves 6$b$ and 6$c$ of the 2nd cylinder #2 and 3rd cylinder #3 becoming cut-out cylinders at the time of partial-cylinder engine operation and the corresponding cams. Further, valve opening operation control devices for controlling the valve opening operations of the exhaust valves 8 are also inserted between the exhaust valves 8 of the 2nd cylinder #2 and 3rd cylinder #3 and the corresponding cams. When all-cylinder engine operation is being performed, these valve opening operation control devices 52 open the intake valves 6$b$ and 6$c$ and the exhaust valves 8 of the 2nd cylinder #2 and the 3rd cylinder #3 in accordance with their corresponding cams, while when partial-cylinder engine operation is being performed, they hold the intake valves 6$b$ and 6$c$ and the exhaust valves 8 of the cut-out cylinders in the closed state. Note that in FIG. 29, 6$a$, 51$a$, 6$d$, and 51$d$ show the 1st cylinder #1 and its corresponding cam and the 4th cylinder #4 and its corresponding cam.

Now, in the fourth embodiment according to the present invention, when the representative upstream-side stored oxygen value OXU or the representative downstream-side stored oxygen value OXD becomes smaller than its corresponding allowable lower limit LLU or LLD and partial-cylinder engine operation is being performed, valve opening control is performed to open the intake valves and exhaust valves of the cut-out cylinders. As a result, air passes through the combustion chambers of the cut-out cylinders, so the representative upstream-side stored oxygen value OXU and the representative downstream-side stored oxygen value OXD are quickly increased. Note that when performing valve opening control, slight rich control is performed at the operating cylinders. By doing this, the average air-fuel ratio of the exhaust gas is prevented from greatly deviating from the stoichiometric air-fuel ratio.

The changes $\Delta$OXU and $\Delta$OXD of the representative upstream-side stored oxygen value OXU and the representative downstream-side stored oxygen value OXD when valve opening control is performed are calculated by the following equations:

$$\Delta OXU = Ga \cdot (KFCU - KRU)/2$$

$$\Delta OXD = Ga \cdot (KFCD - KRD)/2$$

Here, the cut-out cylinders can be considered in the same way as the case where fuel to the engine is cut, so the weighting coefficients KFCU and KFCD in that case are used.

Next, if the representative upstream-side stored oxygen value OXU or the representative downstream-side stored oxygen value OXD becomes larger than the corresponding allowable upper limit ULU or ULD, the valve opening control is ended, that is, the intake valves and exhaust valves of the cut-out cylinders are held in the closed state.

As opposed to this, when the representative upstream-side stored oxygen value OXU or the representative downstream-side stored oxygen value OXD becomes smaller than the corresponding allowable lower limit LLU or LLD and partial-cylinder engine operation is not being performed, slight lean control is performed.

Figure 30:
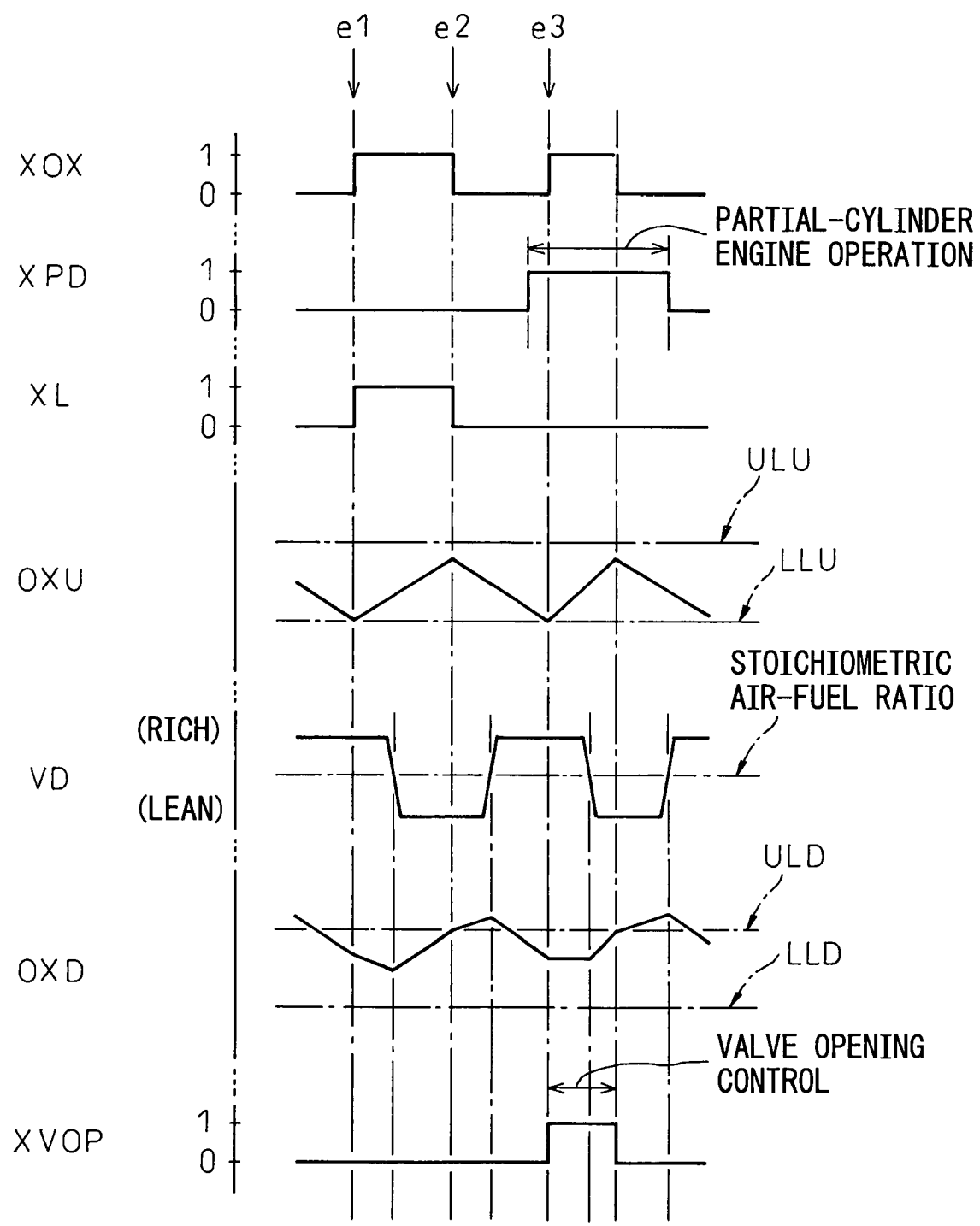
FIG. 30 is a time chart for explaining the fourth embodiment according to the present invention.

Next, the fourth embodiment according to the present invention will be further explained with reference to FIG. 30. In FIG. 30, XOX indicates an oxygen supply flag, XPD a partial-cylinder engine operation flag, and XVOP a valve opening flag. The oxygen supply flag XOX is set (XOX=1) when the amount of stored oxygen in the upstream-side catalyst 20$u$ or the downstream-side catalyst 20$d$ should be increased and is reset (XOX=0) otherwise. The partial-cylinder engine operation flag XPD is set (XPD=1) when partial-cylinder engine operation should be performed, and is reset (XPD=0) when all-cylinder engine operation should be performed. Further, XVOP is set (XVOP=1) when the later mentioned valve opening control should be performed, and is reset otherwise (XVOP=0).

For example, when the representative upstream-side stored oxygen value OXU becomes smaller than its allowable lower limit LLU (see e1 of FIG. 30), the oxygen supply flag XOX is set (XOX=1). At this time, partial-cylinder engine operation is not being performed, so the lean flag XL is set (XL=1), that is, slight lean control is performed. Next, for example when the representative downstream-side stored oxygen value OXD becomes larger than its allowable upper limit ULD (see e2 of FIG. 30), the oxygen supply flag XOX is reset (XOX=0) where the lean flag XL is reset (XL=0), that is, slight rich control is switched to.

Next, when the representative upstream-side stored oxygen value OXU becomes smaller than the allowable lower limit LLU again (see e3 of FIG. 30), the oxygen supply flag XOX is set (XOX=1). At this time, partial-cylinder engine operation is being performed, so the valve opening flag XVOP is set (XVOP=1) and therefore valve opening control is started. In this case, the lean flag XL is held at the reset state (XL=0), that is, slight rich control is performed. Next, for example, when the representative downstream-side stored oxygen value OXD becomes larger than the allowable upper limit ULD (see e4 of FIG. 30), the oxygen supply flag XOX is reset (XOX=0) and the valve opening flag XVOP is reset (XVOP=0), therefore the valve opening control is stopped.

Note that if performing the valve opening control when the engine load L is relatively high, the representative upstream-side stored oxygen value OXU and the representative downstream-side stored oxygen value OXD may excessively rapidly increase. Therefore, in a fourth embodiment according to the present invention, valve opening control is performed when the engine load is lower than a predetermined set load L3 (<L2) and valve opening control is not performed, but slight lean control is performed when the engine load L is higher than the set load L3.

Figure 31:
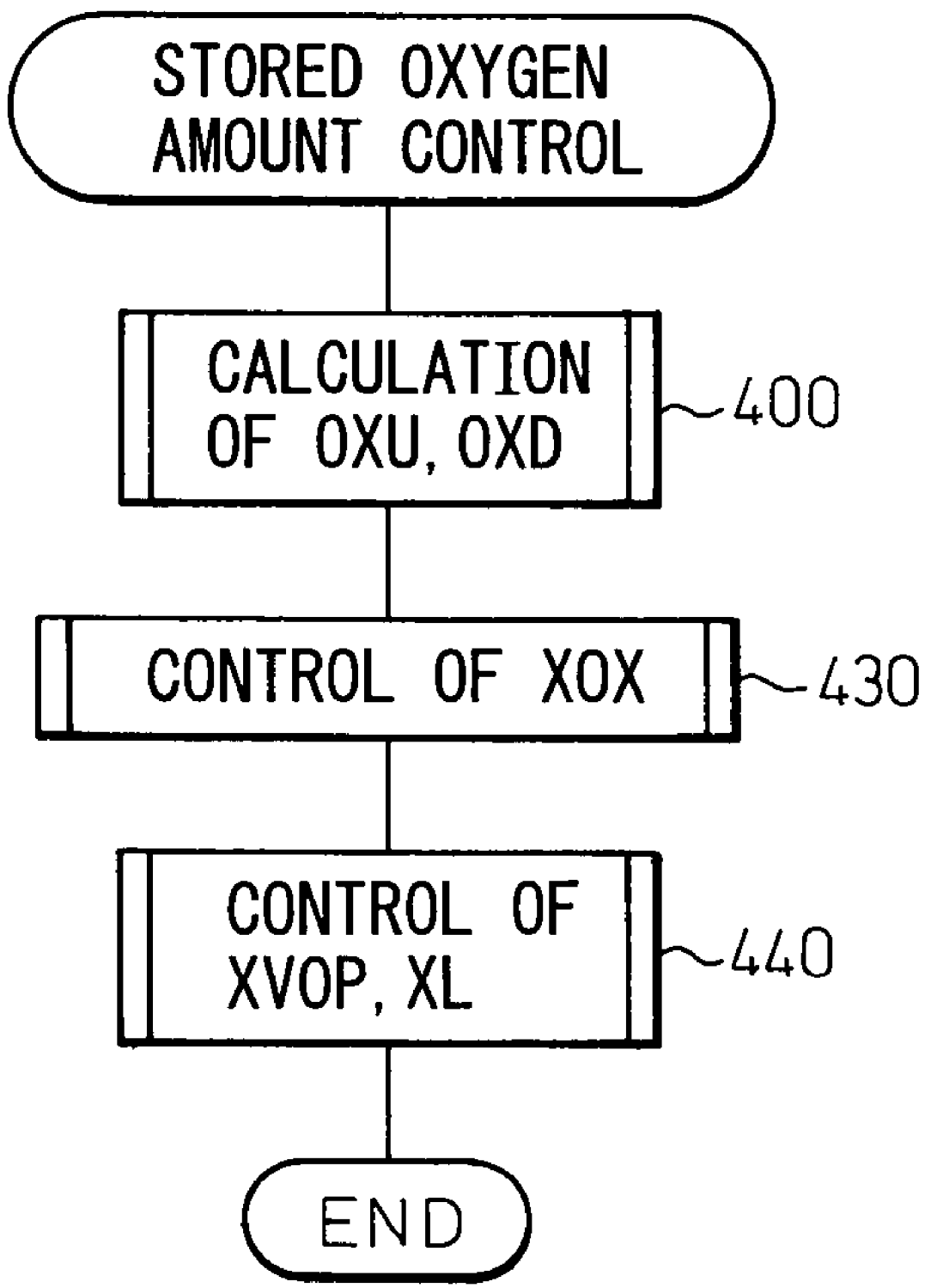
FIG. 31 is a flow chart of a routine for control of the amount of stored oxygen of the fourth embodiment according to the present invention.

FIG. 31 shows a routine for control of the amount of stored oxygen of fourth embodiment according to the present invention. This routine is executed by interruption every predetermined set time.

Figure 35:
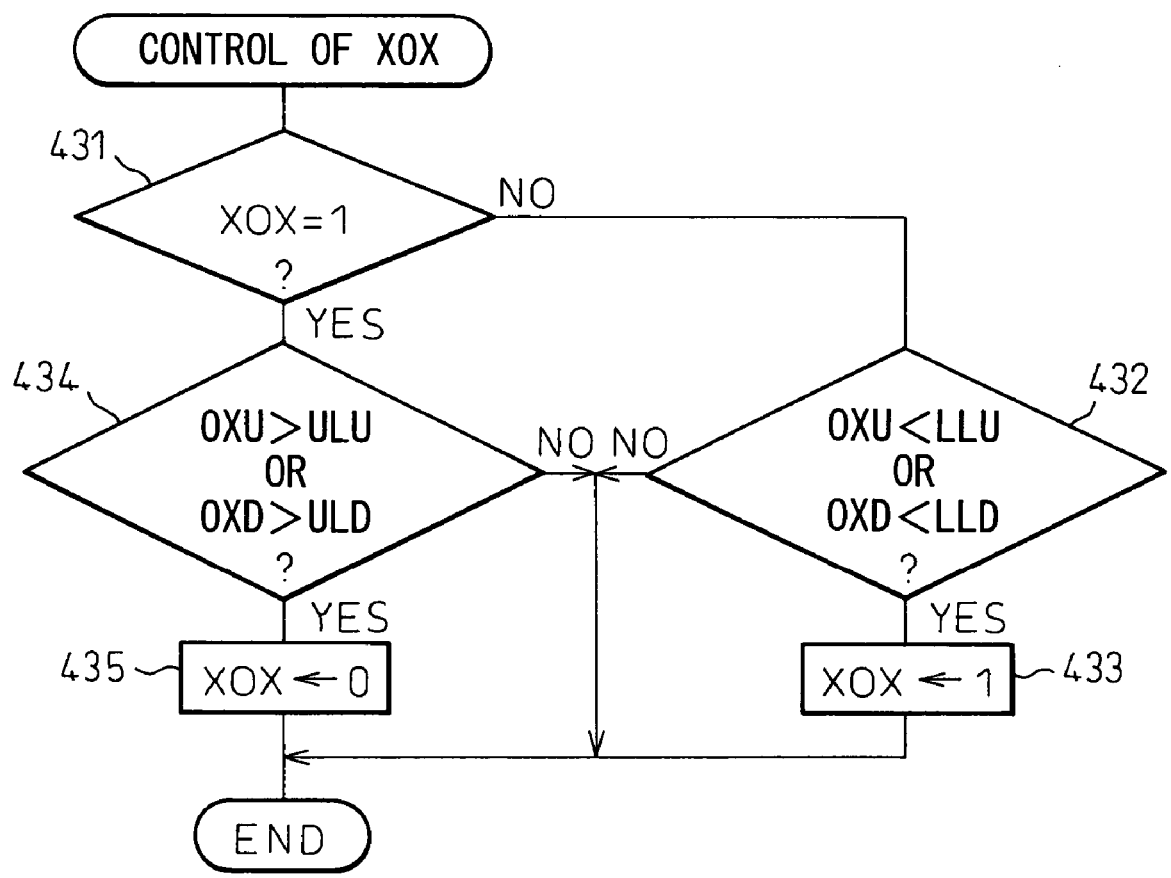
FIG. 35 is a flow chart of a routine for control of an oxygen supply flag XOX of the fourth embodiment according to the present invention.
Figure 36:
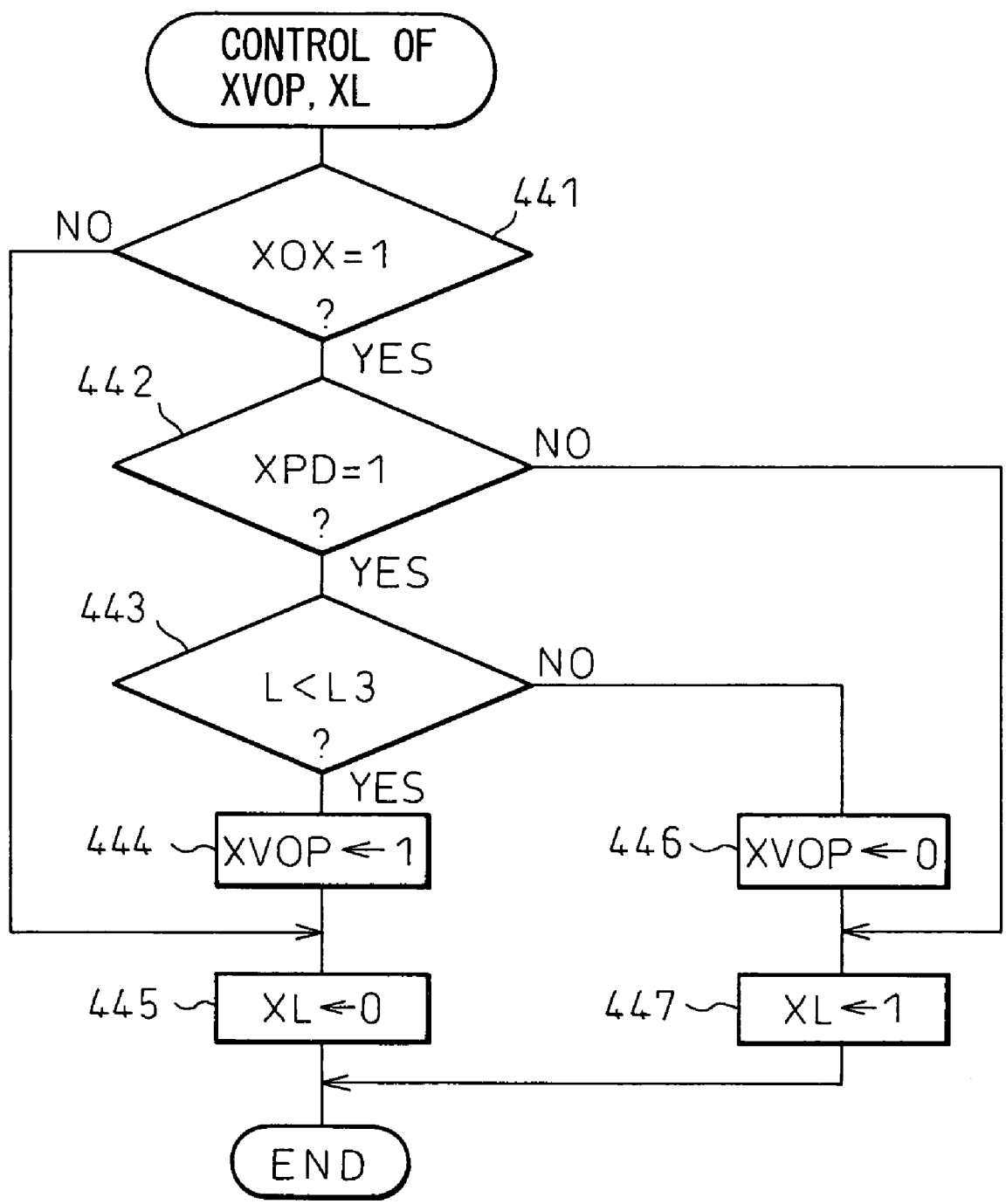
FIG. 36 is a flow chart of a routine for control of a valve opening flag XVOP and lean flag XL of the fourth embodiment according to the present invention.

Referring to FIG. 31, at step 400, the routine for calculation of the representative upstream-side stored oxygen value OXU and the representative downstream-side stored oxygen value OXD of the fourth embodiment according to the present invention is executed. This routine is shown from FIG. 32 to FIG. 34. At the next step 430, the routine for control of the oxygen supply flag XOX is executed. This routine is shown in FIG. 35. At the next step 440, a routine for control of the valve opening flag XVOP and the lean flag XL is executed. This routine is shown in FIG. 36.

Figure 32:
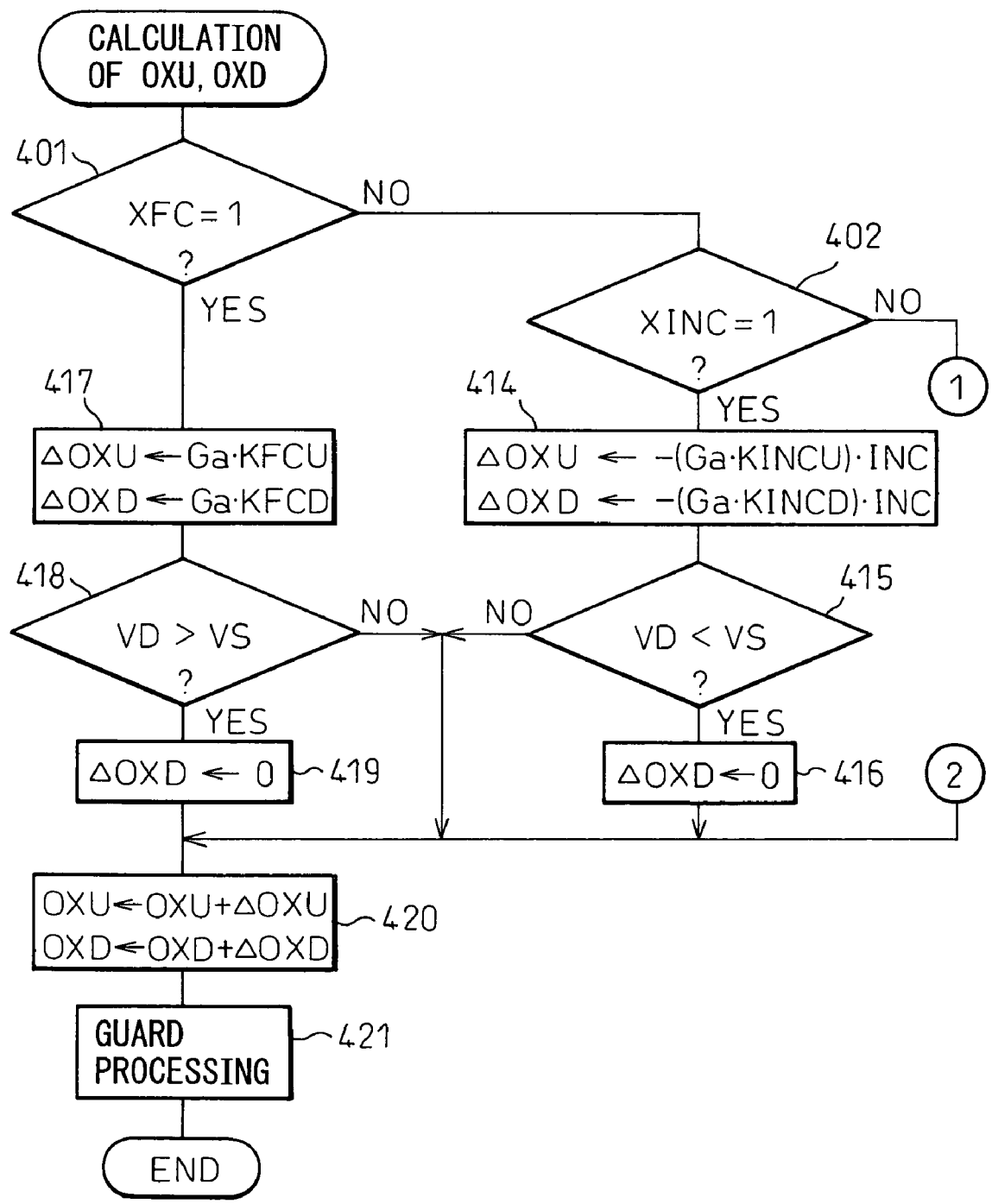
FIG. 32 is a flow chart of a routine for calculation of representative stored oxygen values OXU and OXD of the fourth embodiment according to the present invention.
Figure 33:
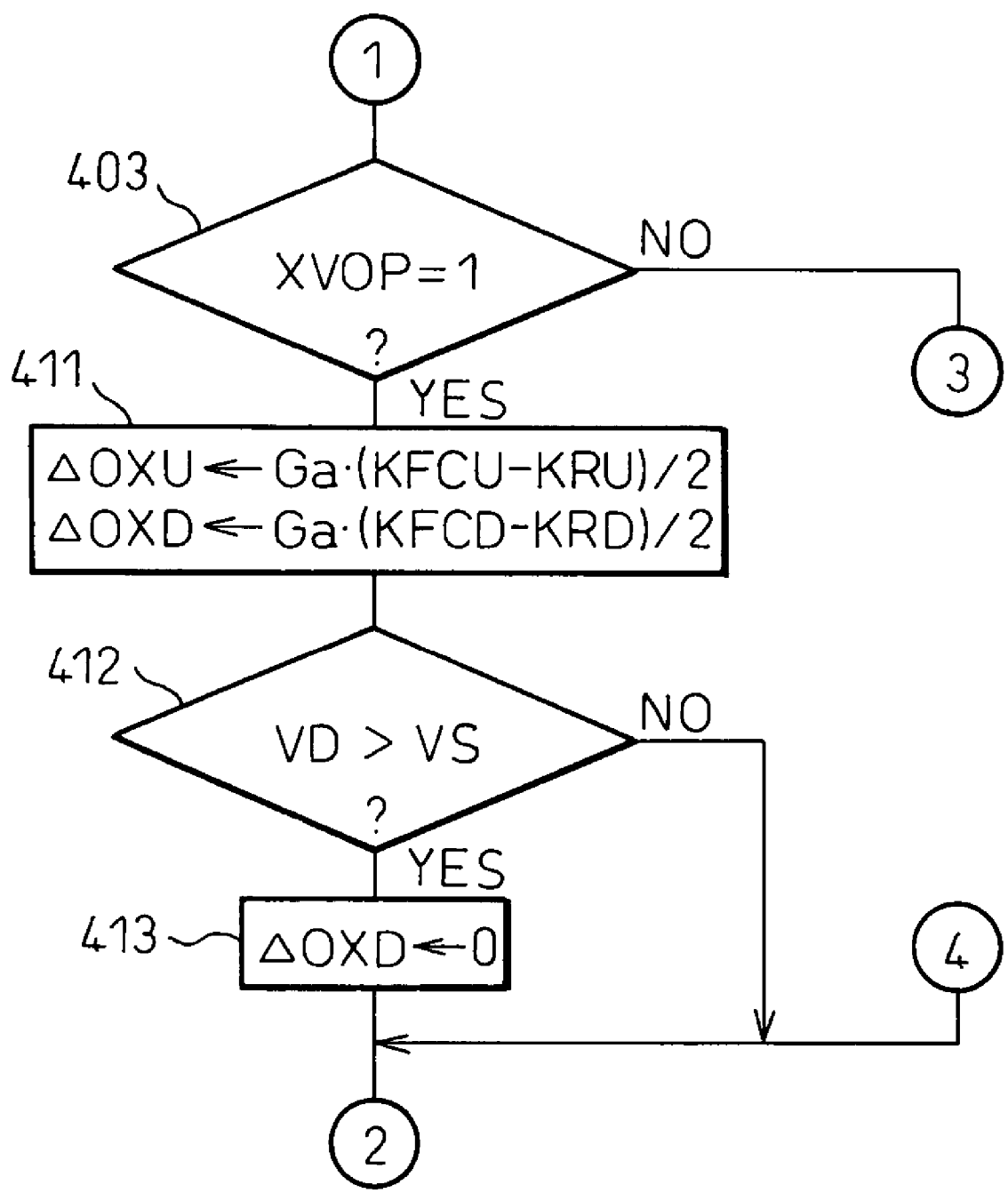
FIG. 33 is a flow chart of a routine for calculation of representative stored oxygen values OXU and OXD of the fourth embodiment according to the present invention.
Figure 34:
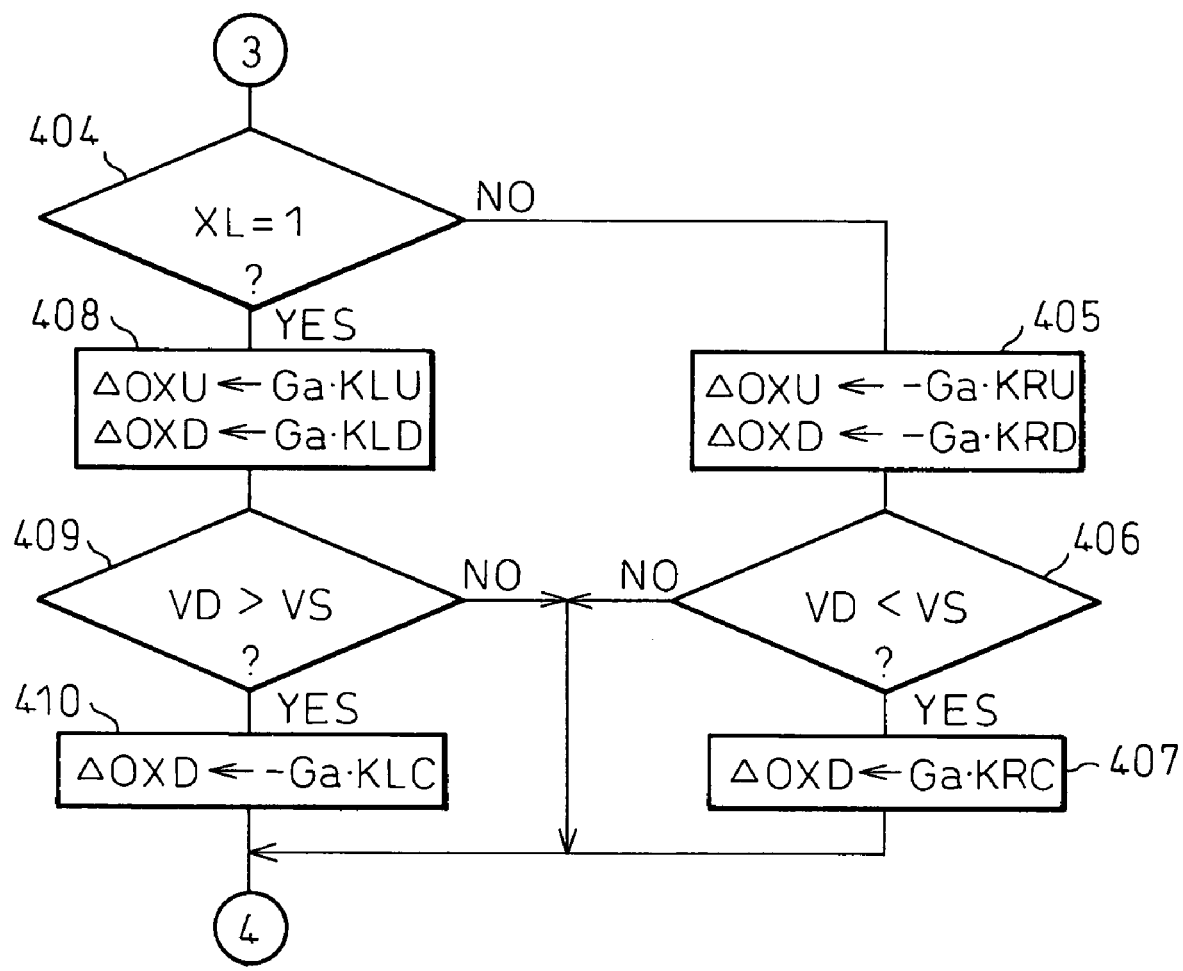
FIG. 34 is a flow chart of a routine for calculation of representative stored oxygen values OXU and OXD of the fourth embodiment according to the present invention.

Referring to FIG. 32 to FIG. 34 showing the routine for calculation of the representative upstream-side stored oxygen value OXU and the representative downstream-side stored oxygen value OXD of the fourth embodiment according to the present invention, at step 401, whether the fuel cut flag XFC is set is judged. When the fuel cut flag XFC is reset (XFC=0), next the routine proceeds to step 402 where whether the fuel increase correction flag XINC is set is judged. When the fuel increase correction flag XINC is reset (XINC=0), next the routine proceeds to step 403 where whether the valve opening flag XVOP is set is judged. When the valve opening flag XVOP is reset (XVOP=0), next the routine proceeds to step 404 where whether the lean flag XL is set is judged. When the lean flag XL is reset (XL=0), that is, when slight rich control is being performed, next the routine proceeds to step 405 where the changes $\Delta$OXU and $\Delta$OXD are calculated ($\Delta$OXU=-Ga·KRU, $\Delta$OXD=-Ga·KRD). Next, at step 406, whether the output voltage VD of the downstream-side air-fuel ratio sensor 41d is lower than the voltage VS corresponding to the stoichiometric air-fuel ratio is judged. When VD<VS, that is, when slight lean control is being performed, and the air-fuel ratio detected by the downstream-side air-fuel ratio sensor 41d is lean, the routine proceeds to step 407 where the representative downstream-side stored oxygen value OXD is calculated ($\Delta$OXD=Ga·KRC). Next, the routine proceeds to step 420. As opposed to this, when VD$\geq$VS, that is, when slight rich control is being performed, and the air-fuel ratio detected by the downstream-side air-fuel ratio sensor 41d is rich, the routine jumps from step 406 to step 420.

As opposed to this, when the lean flag XL is set (XL=1), that is, when slight lean control is being performed, the routine proceeds from step 404 to step 408 where the changes $\Delta$OXU and $\Delta$OXD are calculated ($\Delta$OXU=Ga·KLU, $\Delta$OXD=Ga·KLD). Next, at step 409, whether the output voltage VD of the downstream-side air-fuel ratio sensor 41d is higher than the voltage VS corresponding to the stoichiometric air-fuel ratio is judged. When VD>VS, that is, when slight lean control is being performed, and the air-fuel ratio detected by the downstream-side air-fuel ratio sensor 41d is rich, the routine proceeds to step 410 where the representative downstream-side stored oxygen value OXD is calculated ($\Delta$OXD=-Ga·KLC). Next, the routine proceeds to step 420. As opposed to this, when VD$\leq$VS, that is, when the slight lean control is being performed, and the air-fuel ratio detected by the downstream-side air-fuel ratio sensor 41d is lean, the routine jumps from step 409 to step 420.

When the valve opening flag XVOP is set (XVOP=1), the routine proceeds from step 403 to step 411 where the changes $\Delta$OXU and $\Delta$OXD are calculated ($\Delta$OXU=Ga·(KFCU-KRU)/2, $\Delta$OXD=Ga·(KFCD-KRD)/2). Next, at step 412, whether the output voltage VD of the downstream-side air-fuel ratio sensor 41d is higher than the voltage VS corresponding to the stoichiometric air-fuel ratio is judged. When VD>VS, that is, when valve opening control is being performed, and the air-fuel ratio detected by the downstream-side air-fuel ratio sensor 41d is rich, the routine proceeds to step 413 where the change $\Delta$OXD of the representative downstream-side stored oxygen value OXD is made zero ($\Delta$OXD=0). Next, the routine proceeds to step 420. As opposed to this, when VD$\leq$VS, that is, when the valve opening control is being performed, and the air-fuel ratio detected by the downstream-side air-fuel ratio sensor 41d is lean, the routine jumps from step 412 to step 420.

When the fuel increase correction flag XINC is set (XINC=1), the routine proceeds from step 402 to step 414 where the changes $\Delta$OXU and $\Delta$OXD are calculated ($\Delta$OXU=-(Ga·KINCU)·INC, $\Delta$OXD=-(Ga·KINCD)·INC). Next, at step 415, whether the output voltage VD of the downstream-side air-fuel ratio sensor 41d is lower than the voltage VS corresponding to the stoichiometric air-fuel ratio is judged. When VD<VS, that is, when fuel increase correction is being performed, and the air-fuel ratio detected by the downstream-side air-fuel ratio sensor 41d is lean, the routine proceeds to step 416 where the change $\Delta$OXD of the representative downstream-side stored oxygen value OXD is made zero ($\Delta$OXD=0). Next, the routine proceeds to step 420. As opposed to this, when VD$\geq$VS, that is, when the fuel increase correction is being performed, and the air-fuel ratio detected by the downstream-side air-fuel ratio sensor 41d is rich, the routine jumps from step 415 to step 420.

When the fuel cut flag XFC is set (XFC=1), that is, when the fuel to the engine is cut, the routine proceeds from step 401 to step 417 where the changes $\Delta$OXU and $\Delta$OXD are calculated ($\Delta$OXU=Ga·KFCU, $\Delta$OXD=Ga·KFCD). Next, at step 418, whether the output voltage VD of the downstream-side air-fuel ratio sensor 41d is higher than the voltage VS corresponding to the stoichiometric air-fuel ratio is judged. When VD>VS, that is, when fuel to the engine is being cut, and the air-fuel ratio detected by the downstream-side air-fuel ratio sensor 41d is rich, the routine proceeds to step 419 where the change $\Delta$OXD of the representative downstream-side stored oxygen value OXD is made zero ($\Delta$OXD=0). Next, the routine proceeds to step 420. As opposed to this, when VD$\leq$VS, that is, when the fuel to the engine is cut, and the air-fuel ratio detected by the downstream-side air-fuel ratio sensor 41d is lean, the routine jumps from step 418 to step 420.

At step 420, the representative upstream-side stored oxygen value OXU and representative downstream-side stored oxygen value OXD are calculated (OXU=OXU+$\Delta$OXU, OXD=OXD+$\Delta$OXD). Next, at step 421, guard processing is performed.

Referring to FIG. 35 showing a routine for control of the oxygen supply flag XOX, at step 431, whether the oxygen supply flag XOX is set is judged. When the oxygen supply flag XOX is reset (XOX=0), next the routine proceeds to step 432, where whether the representative upstream-side stored oxygen value OXU or representative downstream-side stored oxygen value OXD is smaller than the corresponding allowable lower limit LLU or LLD is judged. When OXU≧LLU and OXD≧LLD, the processing cycle ends, while when OXU<LLU or OXD<LLD, next the routine proceeds to step 433 where the oxygen supply flag XOX is set (XOX=1).

When the oxygen supply flag XOX is set (XOX=1), the routine proceeds from step 431 to step 434 where whether the representative upstream-side stored oxygen value OXU or the representative downstream-side stored oxygen value OXD is larger than the corresponding allowable upper limit ULU or ULD is judged. When OXU≦ULU and OXD≦ULD, the processing cycle is ended, while when OXU>ULU or OXD>ULD, next the routine proceeds to step 435 where the oxygen supply flag XOX is reset (XOX=0).

Referring to FIG. 36 showing the routine for control of the valve opening flag XVOP and the lean flag XL, at step 441, whether the oxygen supply flag XOX is set is judged. When the oxygen supply flag XOX is set (XOX=1), next the routine proceeds to step 442 where whether the partial-cylinder engine operation flag XPD is set is judged. When the partial-cylinder engine operation flag XPD is set (XPD=1), next the routine proceeds to step 443 where whether the engine load L is higher than the set load L3 is judged. When L<L3, next the routine proceeds to step 444 where the valve opening flag XVOP is set (XVOP=1). At the next step 445, the lean flag XL is reset (XL=0).

As opposed to this, when L≧L3, next the routine proceeds to step 446 where the valve opening flag XVOP is reset (XVOP=0). Next, at step 447, the lean flag XL is set (XL=1).

On the other hand, when the partial-cylinder engine operation flag XPD is reset (XPD=0), the routine proceeds from step 442 to step 447 where the lean flag XL is set (XL=1). As opposed to this, when the oxygen supply flag XOX is reset (XOX=0), the routine proceeds from step 441 to step 445 where the lean flag XL is reset (XL=0).

Figure 37:
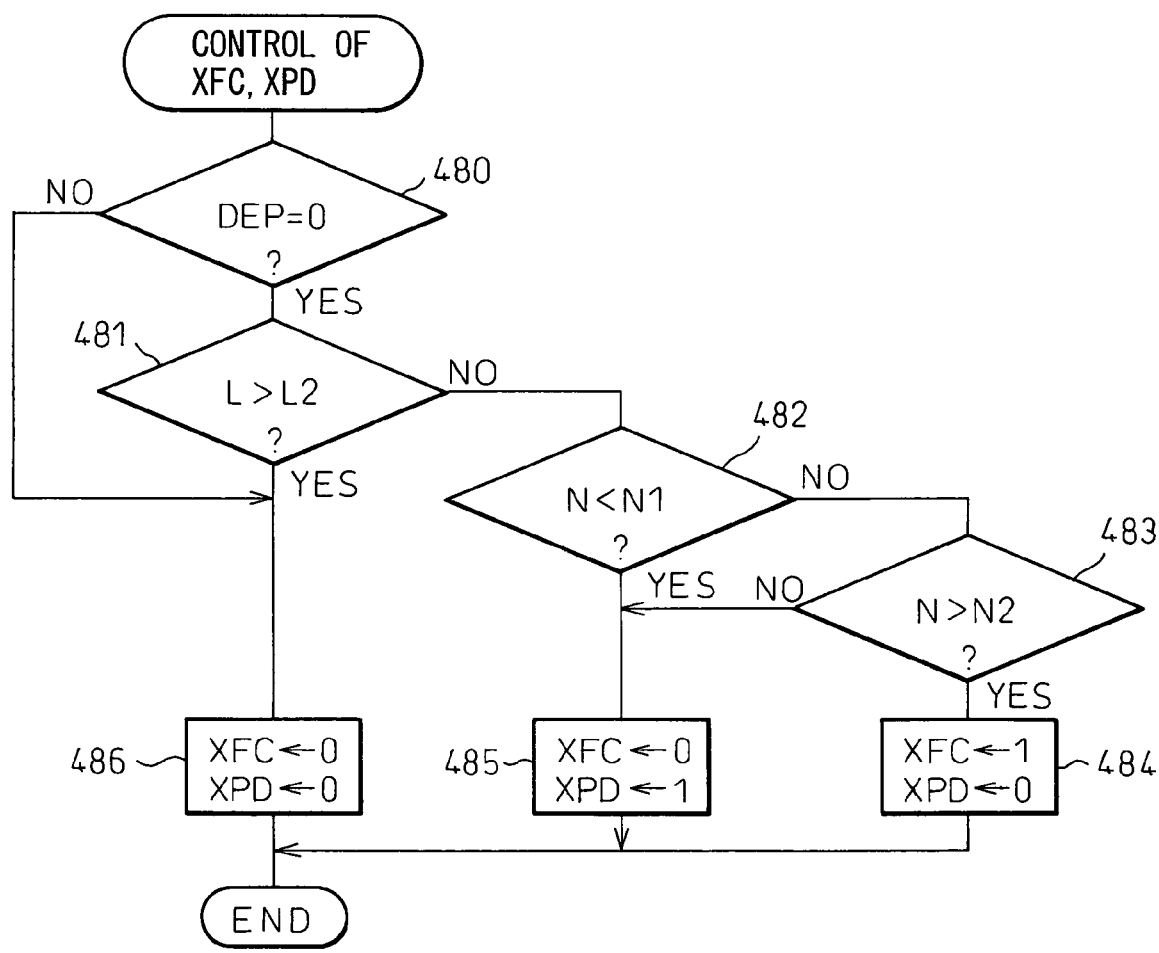
FIG. 37 is a flow chart of a routine for control of a fuel cut flag XFC and partial-cylinder engine operation flag XPD of the fourth embodiment according to the present invention.

FIG. 37 shows a routine for control of the fuel cut flag XFC and partial-cylinder engine operation flag XPD. This routine is executed by interruption every predetermined set time.

Referring to FIG. 37, at step 480, whether the amount of depression DEP of the accelerator pedal is zero is judged. When DEP=0, next the routine proceeds to step 481 where whether the engine load is higher than the above set load L2 is judged. When L≦L2, that is, at the time of engine low load operation, next the routine proceeds to step 482 where whether the engine speed N is lower than a first set speed N1 is judged. When N≧N1, next the routine proceeds to step 483 where whether the engine speed N is higher than a second set speed N2 (<N1) is judged. When N>N2, next the routine proceeds to step 484 where the fuel cut flag XFC is set (XFC=1) and the partial-cylinder engine operation flag XPD is reset (XPD=0).

As opposed to this, when N<N1 at step 482 or N≦N2 at step 483, next the routine proceeds to step 485 where the fuel cut flag XFC is reset (XFC=0) and the partial-cylinder engine operation flag XPD is set (XPD=1).

On the other hand, when DEP>0 at step 480 or L>L2 at step 481, that is, at the time of engine high load operation, next the routine proceeds to step 486 where the fuel cut flag XFC and the partial-cylinder engine operation flag XPD are both reset (XFC=0, XPD=0).

Figure 38:
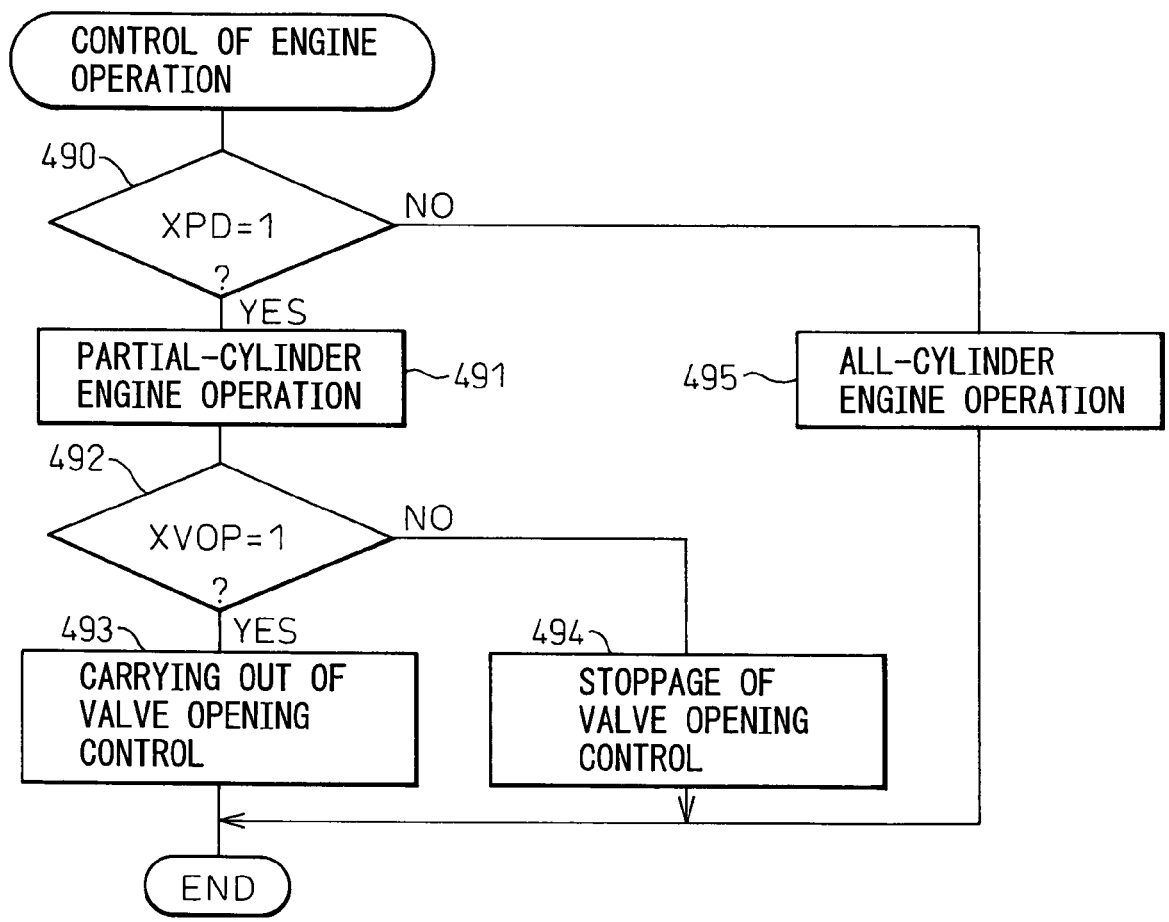
FIG. 38 is a flow chart of a routine for control of operation of the fourth embodiment according to the present invention.

FIG. 38 shows the routine for control of engine operation. This routine is executed by interruption every predetermined set time.

Referring to FIG. 38, at step 490, whether the partial-cylinder engine operation flag XPD is set is judged. When the partial-cylinder engine operation flag XPD is set (XPD=1), next the routine proceeds to step 491 where partial-cylinder engine operation is performed. Next, at step 492, whether a value opening flag XVOP is set is judged. When the valve opening flag XVOP is set (XVOP=1), next the routine proceeds to step 493 where the valve opening control is performed, that is, the intake valves and exhaust valves of the cut-out cylinders are opened. As opposed to this, when the valve opening flag XVOP is reset (XVOP=0), next the routine proceeds to step 494 where the valve opening control is stopped, that is, the intake valves and exhaust valves of the cut-out cylinders are held closed.

On the other hand, when the partial-cylinder engine operation flag XPD is reset (XPD=0), next the routine proceeds to step 495 where all-cylinder engine operation is performed.

The rest of the configuration and action of the fourth embodiment according to the present invention are similar to those of the first embodiment according to the present invention, so their explanations will be omitted.

According to the present invention, it is possible to provide a device for controlling an internal combustion engine able to accurately find the amount of stored oxygen of a downstream-side catalyst when a plurality of catalysts are arranged in an exhaust passage.

While the invention has been described by reference to specific embodiments chosen for purposes of illustration, it should be apparent that numerous modifications could be made thereto by those skilled in the art without departing from the basic concept and scope of the invention.

The following is a list of References provided by Applicant. Please file an Information Disclosure Statement using this information.

| Document Number | Publication Date | Brief Explanation or Page(s) & Line(s) of Related Part(s) |
|---|---|---|
| Japanese Unexamined Patent Publication No. 2001-227383 | Aug. 24, 2001 | Explained in the specification. |
| Japanese Unexamined Patent Publication No. 8-193537 | Jul. 30, 1996 | This discloses that an amount of stored oxygen of the three-way catalyst is increased when supply of fuel to the engine is cut, and is reduced when the air-fuel ratio is made rich. |
| U.S. Pat. No. 6,546,719 | Apr. 15, 2003 | |
| U.S. Pat. No. 5,901,552 | May 11, 1999 | |
| U.S. Pat. No. 5,609,023 | Mar. 11, 1997 | |
| U.S. Pat. No. 5,842,340 | Dec. 1, 1998 | |
| U.S. Pat. No. 5,678,402 | Oct. 21, 1997 | |

The invention claimed is:

1. A device for controlling an internal combustion engine having an exhaust passage, the device comprising:
    an upstream-side catalyst arranged in the exhaust passage, having oxygen storing capability;
    a downstream-side catalyst arranged in the exhaust passage downstream of the upstream-side catalyst, having oxygen storing capability;
    an air-fuel ratio sensor arranged in the exhaust passage between the upstream-side catalyst and the downstream-side catalyst for detecting an air-fuel ratio; and
    stored oxygen amount control means for calculating an amount of stored oxygen of the downstream-side catalyst based on a control state of the engine and an output of the air-fuel ratio sensor, and controlling the amount of stored oxygen of the downstream-side catalyst based on the calculated amount of stored oxygen of the downstream-side catalyst, wherein said stored oxygen amount control means comprises secondary air supplying means for supplying secondary air into the exhaust passage between the upstream-side catalyst and the downstream-side catalyst, and wherein the secondary air is supplied to the downstream-side catalyst when the calculated amount of stored oxygen of the downstream-side catalyst is less than an allowable lower limit.

2. A device according to claim 1, wherein the supply of the secondary air by the secondary air supplying means is allowed at the time of engine low load operation and is prohibited at the time of engine high load operation.

3. A device according to claim 1, wherein said stored oxygen amount control means comprises means for performing air-fuel ratio fluctuation control for forcibly making the air-fuel ratio fluctuate about a stoichiometric air-fuel ratio, and wherein the air-fuel ratio fluctuation control is performed to increase the amount of stored oxygen of the downstream-side catalyst when the calculated amount of stored oxygen of the downstream-side catalyst is less than an allowable lower limit.

4. A device according to claim 1, wherein the air-fuel ratio sensor is configured by a sensor whose output rapidly changes when the air-fuel ratio fluctuates across the stoichiometric air-fuel ratio.

5. A device according to claim 1, wherein said stored oxygen amount control means controls the amount of stored oxygen of the downstream-side catalyst to maintain it at a target amount.

6. A device according to claim 1, wherein the amount of stored oxygen of the downstream-side catalyst is calculated based on whether the engine control state is slight rich control, slight lean control, fuel increase correction, or fuel cut to the engine, and the output of the air-fuel ratio sensor.

7. A device according to claim 1, wherein said stored oxygen amount control means calculates a change of the amount of stored oxygen of the downstream-side catalyst based on the engine control state and the output of the air-fuel ratio sensor and cumulatively adds the change to calculate the amount of stored oxygen of the downstream-side catalyst.

8. A device according to claim 1, wherein the downstream-side catalyst is comprised of a three-way catalyst.

9. A device according to claim 1, wherein said stored oxygen amount control means also calculates an amount of stored oxygen of the upstream-side catalyst based on the engine control state, and controls the air-fuel ratio based on the calculated amount of stored oxygen of the upstream-side catalyst or the calculated amount of stored oxygen of the downstream-side catalyst.

10. A device according to claim 1, wherein said stored oxygen amount control means comprises means for controlling the air-fuel ratio to control the amount of stored oxygen of the downstream-side catalyst.

11. A device according to claim 10, wherein a slight rich control is usually performed and a slight lean control is switched to when the calculated amount of stored oxygen of the downstream-side catalyst is less than an allowable lower limit.

12. A device for controlling an internal combustion engine having an exhaust passage, the device comprising:

an upstream-side catalyst arranged in the exhaust passage, having oxygen storing capability;

a downstream-side catalyst arranged in the exhaust passage downstream of the upstream-side catalyst, having oxygen storing capability;

an air-fuel ratio sensor arranged in the exhaust passage between the upstream-side catalyst and the downstream-side catalyst for detecting an air-fuel ratio;

stored oxygen amount control means for calculating an amount of stored oxygen of the downstream-side catalyst based on a control state of the engine and an output of the air-fuel ratio sensor, and controlling the amount of stored oxygen of the downstream-side catalyst based on the calculated amount of stored oxygen of the downstream-side catalyst; and deterioration degree detecting means for detecting a degree of deterioration of the upstream-side catalyst based on the output of the air-fuel ratio sensor while forcibly making the air-fuel ratio fluctuate about the stoichiometric air-fuel ratio, wherein said stored oxygen amount control means comprises means for performing air-fuel ratio fluctuation control for forcibly making the air-fuel ratio fluctuate about a stoichiometric air-fuel ratio, wherein the air-fuel ratio fluctuation control is performed to increase the amount of stored oxygen of the downstream-side catalyst when the calculated amount of stored oxygen of the downstream-side catalyst is less than an allowable lower limit, and wherein detection of the degree of deterioration of the upstream-side catalyst by the deterioration degree detecting means is prohibited at the time of the air-fuel ratio fluctuation control.

13. A device for controlling an internal combustion engine having an exhaust passage, the device comprising:

an upstream-side catalyst arranged in the exhaust passage, having oxygen storing capability;

a downstream-side catalyst arranged in the exhaust passage downstream of the upstream-side catalyst, having oxygen storing capability;

an air-fuel ratio sensor arranged in the exhaust passage between the upstream-side catalyst and the downstream-side catalyst for detecting an air-fuel ratio; and stored oxygen amount control means for calculating an amount of stored oxygen of the downstream-side catalyst based on a control state of the engine and an output of the air-fuel ratio sensor, and controlling the amount of stored oxygen of the downstream-side catalyst based on the calculated amount of stored oxygen of the downstream-side catalyst, wherein said stored oxygen amount control means comprises means for performing air-fuel ratio fluctuation control for forcibly making the air-fuel ratio fluctuate about a stoichiometric air-fuel ratio, wherein the air-fuel ratio fluctuation control is performed to increase the amount of stored oxygen of the downstream-side catalyst when the calculated amount of stored oxygen of the downstream-side catalyst is less than an allowable lower limit, and wherein the amount of stored oxygen of the upstream-side catalyst is corrected based on the average air-fuel ratio at the time of air-fuel ratio fluctuation control.

14. A device for controlling an internal combustion engine having an exhaust passage, the device compnsing:

an upstream-side catalyst arranged in the exhaust passage, having oxygen storing capability;

a downstream-side catalyst arranged in the exhaust passage downstream of the upstream-side catalyst, having oxygen storing capability;

an air-fuel ratio sensor arranged in the exhaust passage between the upstream-side catalyst and the downstream-side catalyst for detecting an air-fuel ratio; and stored oxygen amount control means for calculating an amount of stored oxygen of the downstream-side catalyst based on a control state of the engine and an output of the air-fuel ratio sensor, and controlling the amount of stored oxygen of the downstream-side catalyst based on the calculated amount of stored oxygen of the downstream-side catalyst, wherein the engine is provided with a plurality of cylinders and means for performing a partial-cylinder engine operation in which part of the cylinders is operated and stopping operation of the remaining cylinders, an intake valve or exhaust valve of a cut-out cylinder being adapted to be held in the closed state at the time of partial-cylinder engine operation, wherein said stored oxygen amount control means comprises means for performing valve opening control in which the intake valve and exhaust valve of the cut-out cylinder are opened at the time of the partial-cylinder engine operation, and wherein the valve opening control is temporarily performed when the calculated amount of stored oxygen of the downstream-side catalyst is lower than the allowable lower limit at the time of the partial-cylinder engine operation.

15. A device according to claim 14, wherein a slight rich control is performed at the operating cylinder when the valve opening control is performed.

16. A device according to claim 14, wherein the valve opening control is allowed at the time of engine low load operation and is prohibited at the time of engine high load operation.

17. A device according to claim 16, wherein a slight lean control is performed when the calculated amount of stored oxygen of the downstream-side catalyst is lower than the allowable lower limit at the time of the partial-cylinder engine operation and at the time of engine high load operation.

* * * * *